US010502594B2

(12) United States Patent
Baldwin et al.

(10) Patent No.: US 10,502,594 B2
(45) Date of Patent: Dec. 10, 2019

(54) DYNAMIC TRANSDUCER WITH DIGITAL OUTPUT AND METHOD FOR USE

(71) Applicant: EMERSON ELECTRIC (US) HOLDING CORPORATION (CHILE) LIMITADA, Santiago (CL)

(72) Inventors: Joseph C. Baldwin, Knoxville, TN (US); Raymond E. Garvey, III, Loudon, TN (US); Drew L. Mackley, Knoxville, TN (US); John S. Turner, Knoxville, TN (US); Daniel L. Nower, Knoxville, TN (US)

(73) Assignee: Emerson Electric (US) Holding Corporation (Chile) Limitada (CL)

( * ) Notice: Subject to any disclaimer, the term of this patent is extended or adjusted under 35 U.S.C. 154(b) by 768 days.

(21) Appl. No.: 14/260,633

(22) Filed: Apr. 24, 2014

(65) Prior Publication Data

US 2014/0324389 A1 Oct. 30, 2014

Related U.S. Application Data

(60) Provisional application No. 61/816,980, filed on Apr. 29, 2013, provisional application No. 61/817,001, (Continued)

(51) Int. Cl.
*H04B 15/00* (2006.01)
*G01D 9/00* (2006.01)
(Continued)

(52) U.S. Cl.
CPC ............. *G01D 9/005* (2013.01); *G01D 11/30* (2013.01); *G01D 18/00* (2013.01); *G01D 21/00* (2013.01)

(58) Field of Classification Search
CPC ........ G01D 9/005; G01D 11/30; G01D 18/00; G01D 21/00
(Continued)

(56) References Cited

U.S. PATENT DOCUMENTS 5,633,811 A 5/1997 Canada et al.
5,726,911 A 3/1998 Canada et al.
(Continued)

OTHER PUBLICATIONS

Scheffer, C., and Girdhar, P., Practical Machinery Vibration Analysis and Predictive Maintenance, Copyright © 2004 by IDC Technologies.
(Continued)

*Primary Examiner* — Michael P Nghiem
(74) *Attorney, Agent, or Firm* — Luedeka Neely Group, P.C.

(57) ABSTRACT

A digital transducer provides a digital output indicative of dynamic characteristics of machines and processes. The transducer sensors may be single-axis or multiple-axis accelerometers and other measurement sensors. The transducer may be hands-free and wireless in machinery monitoring applications. An integral magnetic mount assists with hands-free data collection. Digital data accumulated in transducer memory may be selectively decimated before or after transfer from the transducer to a remote analyzer. Wireless communications are used to upload measurement setups to the transducer and download data from the transducer to a handheld analyzer or remote computer. Analysis and interpretation of dynamic digital data streams are performed after data is downloaded.

33 Claims, 6 Drawing Sheets

Related U.S. Application Data filed on Apr. 29, 2013, provisional application No. 61/878,320, filed on Sep. 16, 2013, provisional application No. 61/902,499, filed on Nov. 11, 2013.

(51) Int. Cl.
*G01D 11/30* (2006.01)
*G01D 18/00* (2006.01)
*G01D 21/00* (2006.01)

(58) Field of Classification Search
USPC .................................... 702/182, 190, 187
See application file for complete search history.

(56) References Cited

U.S. PATENT DOCUMENTS

| | | |
|---|---|---|
| 5,854,994 A | 12/1998 | Canada et al. |
| 5,895,857 A | 4/1999 | Robinson et al. |
| 5,965,819 A | 10/1999 | Piety et al. |
| 5,992,237 A | 11/1999 | McCarty et al. |
| 6,006,164 A | 12/1999 | McCarty et al. |
| 6,138,078 A | 10/2000 | Canada et al. |
| 6,192,325 B1 | 2/2001 | Piety et al. |
| 6,249,237 B1* | 6/2001 | Prater ................. H03M 3/462 341/126 |
| 6,435,902 B1 | 8/2002 | Groh et al. |
| 6,598,479 B1 | 7/2003 | Robinson et al. |
| 6,816,816 B2 | 11/2004 | Slates et al. |
| 6,889,553 B2 | 5/2005 | Robinson et al. |
| 6,892,581 B2 | 5/2005 | Robinson et al. |
| 7,142,990 B2 | 11/2006 | Bouse et al. |
| 7,493,220 B2 | 2/2009 | Leigh et al. |
| 7,493,230 B2 | 2/2009 | Schwartz et al. |
| 7,561,200 B2* | 7/2009 | Garvey, III ............. H04N 5/77 348/333.01 |
| 8,174,402 B2 | 5/2012 | Bouse et al. |
| 8,219,361 B2 | 7/2012 | Leigh |
| 9,778,080 B2* | 10/2017 | Garvey, III ............ G01D 18/00 |
| 2009/0058696 A1* | 3/2009 | Baldwin ................. G01H 1/16 341/110 |
| 2010/0150062 A1* | 6/2010 | Sjogren ................ H04L 1/0083 370/328 |
| 2011/0049247 A1* | 3/2011 | Black ................... G01D 11/245 235/492 |
| 2011/0067290 A1* | 3/2011 | Miskatovic .......... A01K 97/125 43/17 |
| 2011/0085859 A1* | 4/2011 | Yost ..................... E01C 19/004 404/84.5 |
| 2012/0041695 A1 | 2/2012 | Baldwin |
| 2014/0067289 A1* | 3/2014 | Baldwin ................ G01H 1/003 702/56 |
| 2014/0324367 A1* | 10/2014 | Garvey, III ............ G01D 18/00 702/56 |
| 2017/0003163 A1* | 1/2017 | Baldwin ................ G01H 1/003 |
| 2017/0356771 A1* | 12/2017 | Mann .................... G01D 18/00 |

OTHER PUBLICATIONS

Reference Manual AMS™ Suite: Machinery Health™ Manager Online System Software Applications for the CSI 4500 Machinery Health™ Monitor, Part # 97460.7, Copyright © 2007 by Emerson Process Management, p. 3-53.

Azima-DLI, "Trio™ 8-Series, Expert Reliabilty Products" brochure, published on http://azimadli.com/trio/ at least as early as Mar. 2014

DLI Engineering, ExpertAlert expert automated diagnostic software user's manual, Version 2.5, Jun. 2001.

SKF Reliability Systems, Wireless Machine Condition Detector CMVL 8000, 2007.

Azima-DLI, T4-CX-7 product specifications, published on http://azimadli.com at least as early as Nov. 2013.

Azima-DLI, Trio™ and Watchman™ product brochure, published on http://azimadli.com at least as early as Nov. 2013.

Dytran Instruments Inc., VibraScout™ Triaxial Vibration Sensor & Analysis Software, published on http://dytran.com at least as early as Apr. 2014.

* cited by examiner

US 10,502,594 B2

DYNAMIC TRANSDUCER WITH DIGITAL OUTPUT AND METHOD FOR USE

RELATED APPLICATIONS

This application claims priority to provisional patent application Ser. Nos. 61/816,980, filed Apr. 29, 2013, titled "Dynamic Transducer Having Digital Output," 61/817,001, filed Apr. 29, 2013, titled "Remote Analysis Services Using a Dynamic Transducer Having Digital Output," 61/878,320, filed Sep. 16, 2013, titled "Remote Analysis Services Using a Dynamic Transducer Having Digital Output," and 61/902,499, filed Nov. 11, 2013, titled "Method and Apparatus for Dynamic Transducer with Digital Output," the entire contents of which are incorporated herein by reference.

FIELD

This invention relates to digital data collection and processing. More particularly, this invention relates to a hands-free cable-free machine/process measuring transducer that senses a dynamic characteristic and transforms it into digital dynamic waveform information that is typically transmitted to another device for further processing, analysis and interpretation.

BACKGROUND

Known machine analyzer systems are described in U.S. Pat. No. 5,633,811 (Canada), US 2012/0041695 (Baldwin), U.S. Pat. No. 5,895,857 (Robinson), U.S. Pat. No. 6,889,553 (Robinson), U.S. Pat. No. 7,142,990 (Bouse), U.S. Pat. No. 8,174,402 (Bouse), U.S. Pat. No. 6,138,078 (Canada), U.S. Pat. No. 8,219,361 (Leigh) and U.S. Pat. No. 7,493,220 (Leigh). In these prior systems, an analog power and communication link between an analog sensor and an analog input to a machine analyzer is provided through a continuous fixed-length cable. The analog sensor signal is preprocessed, and converted into digital data at a relatively high sampling rate, and the resulting digital data is further processed to derive waveform data at a desired frequency of interest.

The analog sensor cable in these prior systems can be both limiting and burdensome. A cable is limiting in that it must be unbroken, with precise electrical and mechanical continuity between sensor and analyzer. A cable is burdensome in that it can become a physical hindrance limiting mobility or range of motion, and it can frustrate an operator due to tangling, kinking, twisting, or not-twisting when needed. U.S. Pat. No. 6,435,902 (Robinson) describes a swivel mount to allow for a limited range of cable motion. A cable may become engaged in a tight space between moving surfaces where expensive damage to machinery and loss of production may result. Some cables are manufactured in a spring-like coil to provide extensibility to compensate for some of the aforementioned issues. Even with such precautions, use of a cable between a sensor placed in contact with or mounted on a mechanical system on one end of the cable and a handheld analyzer on the other end of the same cable can be inconvenient. For on-line systems, installation of cables and conduits can be time consuming and expensive. It can be difficult or impractical to install cables due to an articulation, translation, or rotation of a mechanical system.

SUMMARY

Embodiments described herein overcome limitations of the prior art by implementing a dynamic transducer with memory, analog-to-digital conversion, digital data processing including decimation and selective decimation, digital output, and digital data transmission to an analyzer that receives digital data. The various embodiments transfer digital data for analysis by a remote analysis service, by a handheld analyzer, by an online analyzer, by a computer work station, or by a process control system. Processed digital data may be temporarily stored in the transducer's memory until it can be transferred to another device. The data transfer may occur one measurement waveform at a time in approximately the same timeframe as data is collected. Alternatively, data may be collected in multiple waveforms with other information, batched and stored in memory, and the transfer may take place over a relatively long time interval or at a later time. Delayed batch information, sequence information, or route (sometimes called a round) information may be transmitted per a protocol or file format comprising multiple measurements. An analyzer further processes the digital output data sent to it from a digital sensor. Further processing by an analyzer typically includes analysis and interpretation of the measurement information.

In some embodiments, measurement setup instructions are transferred to the digital transducer at some time before a measurement is initiated. New measurement setup instructions may be communicated to the transducer prior to each new measurement. A measurement that monitors a dynamic characteristic of a machine or a process is typically a digital waveform representation of a continuous analog measurement interval. Instead of transferring new measurement setup information to a digital transducer before each new measurement, a portion of a route file or another programmed file may be transferred to provide measurement setup instructions covering multiple measurements, such as a sequence, a route, a batch, or a pick-list of multiple measurement setups from which a user or program logic chooses. Some embodiments implement near field communications, such as Bluetooth™ or another wireless protocol, to provide bidirectional communication with the digital transducer.

One preferred embodiment provides a portable digital transducer for collecting dynamic measurement data associated with one or more machines or processes. The portable digital transducer of this embodiment includes a dynamic analog sensor, an analog signal processing circuit, an analog-to-digital conversion circuit, a decimation processor, a memory device, a digital signal processing circuit, a communications interface, and a power source. All of these components are preferably disposed within a portable housing that is configured for hands-free and cable-free data collection. The dynamic analog sensor generates an analog sensor signal based on measurements of dynamic characteristics of the one or more machines or processes. The analog signal processing circuit preprocesses the analog sensor signal before conversion into a digital signal. The analog-to-digital conversion circuit oversamples the analog sensor signal at a sampling rate to generate oversampled dynamic digital measurement data. The decimation processor is programmed to derive at least two synchronized datasets from the oversampled dynamic digital measurement data, including a first dataset resulting from filtering and nonselective decimation of the oversampled dynamic digital measurement data, and a second dataset resulting from filtering and selective decimation of the oversampled dynamic digital measurement data. The memory device stores the synchronized datasets until they are transferred to an external device. The digital signal processing circuit controls the portable digital transducer in collecting the oversampled dynamic digital measurement data and storing the synchronized datasets in the memory device in multiple data groups with information associating each data group. The communications interface transfers configuration settings from an external device to the memory device and transfers the synchronized datasets from the memory device to an external device. The power source powers the portable digital transducer to collect and store the dynamic digital measurement data, and maintain the synchronized datasets in the memory device until they are transferred to the external device.

In some embodiments, the communications interface receives route information from an external device. The route information indicates a route of measurement locations at which the portable digital transducer is to collect the dynamic digital measurement data. The memory device stores the route information, and the digital signal processing circuit accesses the route information from the memory device for controlling the digital transducer in collecting the dynamic digital measurement data at the multiple measurement locations.

In some embodiments, the communications interface transfers the oversampled dynamic digital measurement data from the memory device to an external device prior to any processing or decimation of the oversampled dynamic digital measurement data.

In some embodiments, the communication interface comprises a wireless radio-frequency interface for generating wireless signals containing the synchronized datasets separated into data packets that are transmitted from the communication interface during periods of time during which no dynamic digital measurement data is being collected. The data packets may be reassembled to form the synchronized datasets in an external device, thereby achieving a lossless data transfer.

In some embodiments, the decimation processor is selectively programmable to derive first, second and/or third synchronized datasets from the oversampled dynamic digital measurement data. The first synchronized dataset results from filtering and nonselective decimation of the oversampled dynamic digital measurement data. The second synchronized dataset results from filtering and selective decimation of the oversampled dynamic digital measurement data. The third synchronized dataset results from filtering and no decimation of the oversampled dynamic digital measurement data.

In another aspect, an embodiment of the invention provides a method for collecting dynamic digital measurement data using a single portable digital transducer at multiple measurement locations associated with one or more machines or processes along a measurement route, and analyzing the dynamic measurement data at a location that may be remote from the multiple measurement locations. The method of this embodiment includes the following steps:

(a) executing a database setup wizard application to store setup information regarding each of the multiple measurement locations in a measurement database;
(b) attaching a mounting pad at each of the multiple measurement locations;
(c) displaying route instructions on a mobile display device carried by measurement personnel, the route instructions for directing the measurement personnel to the multiple measurement locations according to a measurement sequence;
(d) attaching the portable digital transducer to the mounting pad at one of the multiple measurement locations;
(e) activating the portable digital transducer to collect dynamic digital measurement data and store the dynamic digital measurement data in memory within the portable digital transducer;
(f) the portable digital transducer generating an indication signal for indicating to the measurement personnel that data collection is complete at the measurement location;
(g) removing the portable digital transducer from the mounting pad;
(h) attaching the portable digital transducer to the mounting pad at the next measurement location according to the measurement sequence;
(i) repeating steps (e) through (h) until dynamic digital measurement data has been collected and stored for each of the multiple measurement locations of the measurement route;
(j) uploading the dynamic digital measurement data from the portable digital transducer to a data analysis computer; and
(k) analyzing the dynamic digital measurement data using software on the data analysis computer.

In yet another aspect, an embodiment of the invention provides a method for collecting dynamic digital measurement data using multiple portable digital transducers at multiple measurement locations associated with one or more machines or processes, where each of the multiple portable digital transducers has a communication interface. The method of this embodiment includes the following steps:

(a) docking the multiple portable digital transducers to a docking station having multiple interface ports for connecting to the communication interfaces of the multiple portable digital transducers;
(b) transferring a timing synchronization signal from the docking station to each of the portable digital transducers via the interface ports;
(c) based on the timing synchronization signal, synchronizing an internal clock of each portable digital transducer with internal clocks of other of the portable digital transducers;
(d) removing the portable digital transducers from the docking station;
(e) attaching the portable digital transducers at the multiple measurement locations to surfaces associated with the machines or processes;
(f) initiating collection of the dynamic digital measurement data by each of the multiple portable digital transducers over a measurement period, and storing the dynamic digital measurement data within memory of each portable digital transducer in association with a timestamp;
(g) removing the portable digital transducers from the measurement locations;
(h) docking each of the portable digital transducers to the docking station;
(i) downloading the dynamic digital measurement data via the interface ports from each portable digital transducer to an external data analysis device; and
(j) time synchronizing the dynamic digital measurement data collected by the multiple portable digital transducers based on the timestamps.

In yet another aspect, an embodiment of the invention provides a docking station for portable digital transducers and tachometers. The docking station includes multiple interface ports, a synchronization clock, a power supply, and a processor. The interface ports receive and make electrical connection with communication interfaces in the portable digital transducers and tachometers. The synchronization clock generates a timing synchronization signal to be transferred to the portable digital transducers and tachometers via the interface ports. The power supply provides power via the interface ports to charge batteries in the portable digital transducers and tachometers. The processor controls the downloading of measurement data from memory devices in the portable digital transducers and tachometers and controls the uploading of measurement setup parameters to the portable digital transducers and tachometers.

In yet another aspect, an embodiment of the invention provides a measurement setup system for generating measurement instructions to be used in a data collection process. The measurement setup system includes a measurement database that stores measurement setup information for measurement locations associated with one or more machines or processes. The measurement database also stores dynamic measurement data collected by at least one portable digital transducer at the measurement locations. The system also includes a database setup wizard processor in communication with the measurement database. The database setup wizard processor generates configuration settings to be uploaded to the portable digital transducer. The database setup wizard processor also generates route instructions for guiding an operator in placing the portable digital transducer at the measurement locations according to a desired sequence, and for using the portable digital transducer to collect dynamic digital measurement data at each measurement location.

In yet another aspect, an embodiment of the invention provides a method for collecting dynamic digital measurement data using a single portable digital transducer configured to be securely attached to a mobile machine or mobile component of a machine or process. The method of this embodiment includes the following steps:
(a) securely attaching the portable digital transducer to the mobile machine or mobile component;
(b) while the mobile machine or mobile component is disposed at a first location, activating the portable digital transducer to collect dynamic digital measurement data and store the dynamic digital measurement data in memory within the portable digital transducer;
(c) the mobile machine or mobile component moving away from the first location during operation of the mobile machine or mobile component;
(d) the portable digital transducer periodically collecting and storing the dynamic digital measurement data in the memory during operation of the mobile machine or mobile component;
(e) the mobile machine or mobile component moving back to the first location during operation of the mobile machine or mobile component;
(f) uploading the dynamic digital measurement data from the memory of the portable digital transducer to a data analysis computer; and
(g) analyzing the dynamic digital measurement data using software on the data analysis computer.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1A:
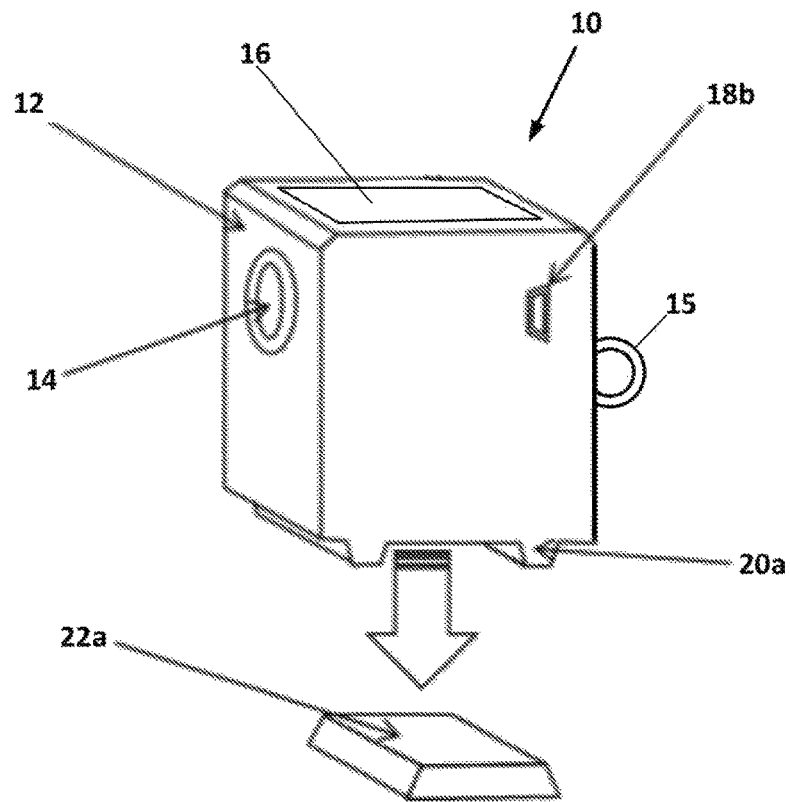
FIGS. 1A, 1B and 1C depict physical configurations of a dynamic digital transducer and mounting structure according to three embodiments of the invention.

FIG. 1A depicts a physical configuration of a dynamic digital transducer 10 according to a preferred embodiment. The transducer 10 includes a housing 12 that is preferably smaller than 50 mm on a side and has a polygon cross section. Housing design considerations include the need for small size, low mass, high stiffness, negligible looseness, low damping, convenient mounting and dismounting, attractive appearance, ergonomic handling, good manufacturability, intrinsic safety, affordable cost, robustness, strength and resilience, material compatibility with the components of the transducer, and fitness for use in the intended monitoring and storage environments. A non-circular geometry may be conducive to a small, light, compact and stiff structure for the digital transducer housing 12. A rectangular design may be more conducive to packing in rectangular-configured geometric devices, such as electronic devices or printed circuits. Linear magnets may be suitable for this geometry and fastening component connections in corners where reinforcements are located can facilitate assembly. In some cases, it may be further advantageous to radius, chamfer or otherwise round the corners of rectangular embodiments of the housing 12, thereby changing a cross sectional shape from square to octagon with four longer sides and four shorter sides. A constant cross section geometry having a noncircular shape may be suitable for injection molding in plastic or metal materials. For embodiments incorporating wireless communications, it may be advantageous to employ a metal segment for a bottom portion and plastic segment for some or all of a top portion to permit wireless transmissions to pass through the housing 12.

One exemplary functional aspect of the housing 12 is an ergonomic aspect, wherein the design of an outer portion of the housing 12 is intended to facilitate orientation and placement of the transducer 10 on a machine for hands-free operation. For example, a registration orientation is included in preferred multi-axial sensor configurations to facilitate repeatable and meaningful measurements in multiple-axis orientations. A second exemplary functional aspect of the housing 12 is a loop 15 on the housing for connecting a cord or a latch for a connecting rod. Such structures may be used to facilitate mounting a hands-free transducer 10 in a difficult location, such as on a paper machine. The cord may be initially pulled snugly to temporarily fix the transducer 10 to a rod which is used to reach a location on a machine. When the transducer is in place, the string or latch may be released to separate the transducer from the rod, thereby allowing a measurement to be made free of significant parasitic mass.

The transducer 10 preferably includes user interface devices, including a user input device 14 and a display device 16. The user input device 14 may be a thumb wheel, contact button, touch pad, proximity detector, or another device capable of receiving and interpreting human inputs. The display screen 16, which may be a liquid crystal display (LCD) or light emitting diode (LED) screen, is preferably disposed on an upper surface of the housing 12. In some embodiments, the input device 14 and display screen 16 are combined as a touch screen.

Figure 2:
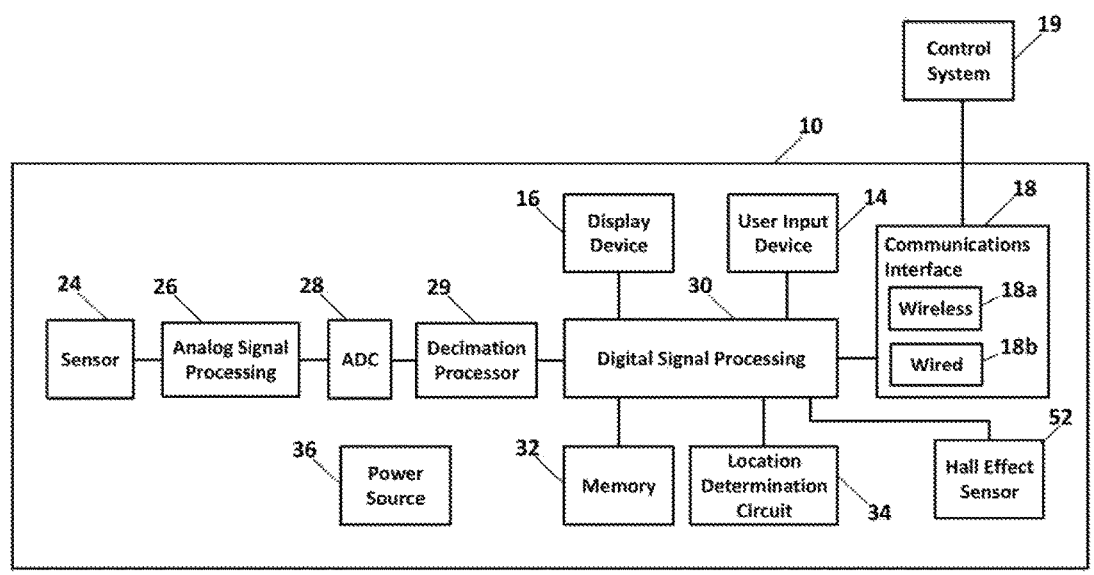
FIG. 2 depicts a functional block diagram of a dynamic digital transducer according to an embodiment of the invention.

FIG. 2 depicts a functional block diagram of a preferred embodiment of the transducer 10 which, in addition to the external components discussed above, includes one or more sensors 24, an analog signal processing circuit 26, an analog-to-digital conversion (ADC) 28 circuit, a decimation processor 29, a digital signal processing circuit 30, memory 32, a data communications interface 18 which may include wireless interface 18a and/or a wired interface port 18b, a location determination circuit 34, and power source 36. The sensors 24 may be single-axis or three-axis piezoelectric sensors or micro-electro-mechanical system (MEMS) sensors. As discussed in more detail hereafter, the data decimation processor 29 may provide data filtering and various forms of data decimation. In some embodiments, the decimation processor 29 is a component of the digital signal processing circuit 30. The wireless interface 18a may incorporate one or more of Wi-Fi, Bluetooth™, Infrared Data Association (IrDA), and near field communication (NFC) wireless protocols for communicating with another device, such as a data analyzer, headphone, mobile computing device, or annunciator in a vicinity of an operator. In some embodiments, the user input device 14 may be complemented, supplemented, or replaced by a remote control implemented using wired or wireless communications.

The wired data interface port 18b, such as a USB port, FireWire port, or other electronic data interface, may be used in a safe zone of a plant, and may be covered or disabled in a hazardous zone. In some embodiments, the wired data interface port 18b is used to transfer power and data communications when the transducer 10 is physically connected to a mating port, such as on the docking station 40 (FIGS. 6 and 7), handheld module, charging circuit, synchronization circuit, or other electronic device.

Preferred embodiments of the transducer 10 include a mechanical mounting interface for attaching the transducer 10 to the structure to be monitored. In some embodiments, the mounting interface comprises an integral magnet disposed in or on the housing 12. Various possible configurations of integral magnetics are depicted as 20a, 20b and 20c in FIGS. 1A, 1B and 1C, respectively. Such structures provide a secure mechanical interface for transmitting mechanical signals and provide a holding force between the housing 12 and a steel surface. Also depicted are optional steel or magnetic pads 22a, 22b and 22c, with corresponding geometric alignment orientations. The pads 22a, 22b, 22c may be mounted, fixed, or adhered to a bearing housing, motor housing, or other machine surface, such as by mechanical fastener, tack weld, epoxy adhesive, or other bonding mechanism suitable for transmitting vibration energy from the machine to the transducer 10. For example, the steel pads 22a, 22b, 22c may have a generally trapezoidal or rectangular cross sections designed to be precisely fitted with the magnetic structures 20a, 20b, 20c on the transducer 10 such that the magnetic flux return path is completed by the steel pad. This provides for repeatable mounting and alignment of the transducer 10 with respect to machine axes at a particular measurement point location, such as along the lines 21a and 21b shown in FIG. 1B. This configuration also provides for excellent physical engagement between contacting surfaces of the transducer 10 in the vicinity of integral magnetics 20a, 20b, 20c and the steel pads 22a, 22b, 22c.

Note that a preferred configuration of integral magnet 20a provides a closed-circuit low-leakage flux path when the transducer 10 is mounted on steel pad 22a, 22b, 22c. The steel pad 22a, 22b, 22c is preferably a ferromagnetic material having a uniform cross section with an intentionally asymmetric aspect to encourage correct X-Y-Z orientation with a machine component, to provide a good flux path, and to provide excellent mechanical transmission of mechanical vibration and stress wave information. Those skilled in the art will appreciate there are many ways to achieve secure mounting for signal transmission, transducer orientation, and quick release. For example, one may arrange the magnetic flux path to flow between the integral magnet posts for configurations 20a and 20b so that the north magnetic pole is on one side of the steel pad and corresponding south magnetic pole is on the other. Alternatively, all or part of the flux may pass horizontally from the transducer post such as 20c into the steel pad 22c and from there into the flat base of the transducer 10. One can see from the variations shown in FIGS. 1A, 1B and 1C, mechanical and signal orientation and mechanical attachment can be accomplished using tapered or orthogonal interfaces in horizontal, vertical, and angular contact arrangements.

These mounting structures provide an advantage over structures disclosed in U.S. Pat. No. 6,892,581 (Robinson '581) which incorporate substantially flat magnets contacting flat mounting surfaces. Instead of a magnet pole contacting a mounting pad on a single flat surface, embodiments of the present invention contact three or more points on multiple surfaces, such as on a tapered surface of a trapezoid, a wedge, a Luer tip, or another type of locking taper. One preferred embodiment comprises a simple trapezoidal pad 22b depicted in FIG. 1B. Securing angular registration along with firm mechanical alignment may be assisted with a pin and key-way or other geometric arrangements wherein a proud member on one part lines up with a recessed location on the aligned and opposing part. In some embodiments, visual indications such as markings also assist an operator with proper alignment between mating surfaces.

In preferred embodiments, measurement setup instructions are transferred to the digital transducer 10 at some time before a measurement is initiated. New measurement setup instructions may be communicated to the transducer 10 prior each new measurement. A measurement that monitors a dynamic characteristic of a machine or a process is typically a digital waveform representation of a continuous analog measurement interval. Instead of transferring new measurement setup information to the digital transducer 10 before each new measurement, a portion of a route file or another programmed file may be transferred to the digital transducer 10 to provide measurement setup instructions covering multiple measurements, such as a sequence, a route, a batch or a pick-list of measurement setups, where a user or program logic picks from multiple choices. As discussed above, near field communications, such as Bluetooth™ or another wireless protocol, are preferred for bidirectional communication with the digital transducer 10.

Various embodiments incorporate an analog-to-digital conversion (ADC) step performed in the transducer 10, which may be located far from the location of the analyzer that will analyze the measurement data. This ADC step generates digital data, which is typically a digital waveform, at least a portion of which is transmitted to the analyzer. Digital data transmission permits analysis and interpretation to take place in a different place and time from the place and time of sensing the analog representation of a dynamic characteristic. By synchronizing transducer clocks and time-stamping digital waveform files, various embodiments of the present invention allow analyzers in remote locations to reconstruct approximately simultaneous data streams from multiple transducers 10. Preferred embodiments of the transducer 10 address inconveniences and burdens of the prior art cable connections and enable new spatial and temporal separation between sensors and the analyzers that analyze and interpret dynamic signal information from the sensors.

A signal analyzer may comprise a portable data collector, a portable analyzer, a control system, an on-line analyzer, a personal computer, a mobile communications device, a remote server, a virtual analyzer hosted from a remote location, a web-based server, web-based portal, or one of many other configurations wherein a processor is programmed to analyze and assist an operator with interpretation of sensor signal information produced by the digital transducer 10.

In various embodiments described herein, the communication interface 18 may be configured to receive and to transmit a control system communications protocol. For example, wireless HART™ protocol may be used. In some embodiments, a HART™ 4-20 mA wired connection may be used. This wired approach provides a source of electrical power, typically up to 4 mA at 24V and potentially up to 12 mA at 24V. As shown in FIG. 2, the digital transducer 10 described herein may receive and transmit data with a control system 19 such as DeltaV™ or Ovation™.

Many different condition-sensing element types may be used in accordance with embodiments of the present invention. Without limiting these embodiments, examples are described using piezoelectric accelerometer sensing elements arranged in X, Y, and Z orthogonal axis orientations. Some embodiments provide for walk-around condition monitoring and data collection, such as using a handheld digital transducer that is periodically attached to a machine to collect machinery condition information indicating the machine condition.

As discussed above, the digital transducer 10 may be used without a cable connecting the transducer 10 to a host analyzer. In some embodiments, digital information from the transducer 10 is transported over distances to a remote memory element for further processing, analysis and interpretation typically using one of the following:
  wireless data transmission from the transducer 10 to an external device;
  physically transporting the transducer 10 with data in its memory from a field location to another location where data is transmitted by wireless media to an external device; or
  physically transporting the transducer from a field location to another device where data is further transmitted by physically connecting the transducer to a data interface, such as a USB port on an external device.

For example, the digital transducer 10 may use the wireless communication interface 18*a* to transmit its data. Typically, a digital waveform signal is transmitted to a handheld analyzer or to a not-handheld vibration analyzer. This wireless transmission may be a lossless data transfer for the most part, even if the transmission rate is intermittent and not in exactly the same timing as the sensor signal. The memory 32 in the digital transducer 10 is typically used to accumulate digital data for subsequent transmission with or without latency. A delayed delivery process using a lossless protocol may overcome latency. For example, a person may carry the transducer 10 and a handheld data collector from measurement location to measurement location accumulating measurement information in the handheld data collector, such as measurement waveforms. Alternatively, a person may carry the transducer 10 from measurement location to measurement location while transmitting wireless measurement information, typically as digital waveforms, to the memory of a data collector or another external device that is not being carried, such as to a wireless gateway connected to a computer with memory, or to a remote analysis server.

A preferred embodiment utilizes a process of connecting or linking or pairing between the digital transducer 10 and a handheld data analyzer. For example, using Bluetooth™, the transducer may be paired with a handheld machinery analyzer, such as a CSI Model 2140 modified to accept digital data via a Bluetooth™ communication link. Once paired, the analyzer and transducer 10 maintain an established communication link for effective measurement transmission and analysis.

Standard current communication protocols such as Bluetooth™ may be narrower in bandwidth and less tightly constrained with respect to timing than may be accomplished using hard-wired digital or analog implementations. Furthermore, it is a challenge to achieve synchronization among multiple transducers as would be needed for precision machinery vibration analysis using cross-channel and phase information. Such current digital communication limitations are expected to change with future improvements. For example, Bluetooth™ is currently highly developed for audio range frequency transmissions. Stress wave and oversampled data and other ultrasonic frequency range data must be buffered in a memory, thereby permitting transmission over a time interval that is greater than real-time because of audio frequency limitations. Yet an approximately real-time wireless transmission rate may be achieved using a delay time in between actual data collections, such as while moving a transducer from one location to another location, or during settling time before a next data acquisition. In situations in which a wireless transmission rate is relatively slow compared to the real-time data rate at which the transducer is actually making a measurement, it is advantageous to transmit a plurality of status indications indicating that it is acceptable to move the transducer, and reporting an analyzed data value such as an overall vibration value, reporting a "good data" or "bad data" or "retest" indication, reporting an error checking or error correction data block such as a check sum, reporting file information such as file size, and reporting a recommendation to take a different measurement. It is reasonable to expect certain not-standard communication protocols for wireless radio or other electromagnetic frequency range signal communication protocols to effectively outperform the conventional Bluetooth protocol considering the need for high frequency, parallel measurements, and synchronized timing.

As another example, the digital transducer 10 may produce multiple measurement waveforms, e.g., measurement sets, which have not yet been fully analyzed or interpreted and store those waveforms in the memory 32 of the transducer. Many digital measurement sets may be accumulated in the memory 32. In this example, an operator may carry the digital transducer from measurement point to measurement point accumulating multiple measurement sets in the memory 32. Alternatively, if measurement sets are stored in the memory 32, the transducer may be left in one location for an extended period of time to accumulate multiple periodic measurement sets or a long waveform, such as a transient data collection waveform from that location. The time span during which measurements can be made may be based on power and memory capacity.

The digital transducer 10 of the preferred embodiment is typically configured or reconfigured just prior to a data collection activity at a measurement point. Transducer configuration or reconfiguration may be performed in the field by a preferred communication mechanism, such as near field communication (NFC), IrDA communication, a proximity detector, the user input device 14, a timed protocol or another input technique to select and initiate a programmed measurement sequence.

Route-based data collection is well known in the art whereby a protocol such as a route file format is used to transfer information about a database and measurement setup and additional information from a host computer to a handheld data collector connected to an analog sensor by a wire or a cable. Later, data collected in the field is added to a route file format and that is updated in the field and transferred back to the host computer.

In contrast to the analog sensors of the prior art, the digital transducer 10 may be used to communicate wirelessly with a portable analyzer that is in communication with a computer running a machinery analysis program capable of route file transfer. In preferred embodiments, the route file provides prompts to guide the operator in a predetermined route (or survey, round or sequence) for collecting condition monitoring data with the digital transducer 10. For example, an operator may proceed from a first machine to a second machine to a third machine. At each machine the operator uses the digital transducer 10 to collect a sequence of measurements from multiple measurement locations on each machine. The configurations for each measurement location may be prescribed in a protocol, such as a route file format, so that each measurement is collected using the correct measurement settings corresponding to each measurement point on each machine. At each measurement point location, near-field communications or another mechanism may be used to select or change a preferred measurement setting. Measurement data may be collected, temporarily stored in transducer memory, transferred wirelessly to the portable analyzer, and stored in the analyzer memory. In this example, data is transferred from digital transducer to portable analyzer wirelessly in a lossless file transfer at approximately the same time it is collected.

In the previous example, the memory of digital transducer 10 holds data temporarily until a lossless file transfer to the handheld or to another device can be made. Alternatively, a longer term persistent memory, such as a flash memory or another form of persistent memory, holds the data until it may be transferred wirelessly or by physical connection to a handheld device, another local device, or a device in a remote location where the measurement data may be further processed, analyzed and interpreted.

In some embodiments, the digital transducer 10 is configured to directly or indirectly receive a route file from a host computer, such as a computer operating machinery analysis software either with or without a handheld device having a display to help guide the operator through a data collection process.

There are several types or modes for data collection that an operator may find useful during a route-based data collection process. Three exemplary types include on-route data, off-route data, and transient data. On-route data is collected from measurement points in a route or list of points. Off-route data, also referred to as "job" data, is collected apart from the predefined locations or measurement settings of a predefined route. Transient data is a special type of off-route or job data collection where data is typically collected for a relatively long interval that spans a changing condition, such as a machine startup, shutdown, load change, speed change, or process condition change. All of these modes of route data collection can be accomplished using the digital transducer 10 with configuration settings communicated to the transducer 10, typically from a data collector.

Startup and coast down are examples of common transient speed operations during which digital transducer measurements may be made. Changing speed and load and thermal growth conditions during transient operations often cause large digital transducer output swings, even during normal healthy machine operation. Both human interpretation and programmed logic interpretation of digital data information collected from digital transducers during transient events are interpreted with awareness of and accounting for additional information about the transient operating states, such as speed, load, and temperature. Therefore, it is important for the digital transducer 10 to log a time stamp, a triggered count, or another time registry so that data may be compiled in the analyzer with chronological or spatial superposition. This provides for coordination of machine state information with digital transducer information, whether the data is interpreted by human logic or programmed logic or both.

A data collector or other handheld analyzer typically has a robust display that an operator in the field can easily view. Such an analyzer also typically has a versatile user interface that allows an operator to provide inputs and replies to prompts during route-based data collection. These interface features are far more expansive than the display device 16 associated with the digital transducer 10. Therefore, a systems designer typically intends for special user inputs, such as notes, off-route job setup, and point configuration or reconfiguration, to be done using the interface of the handheld analyzer rather than using the display 16 of the digital transducer.

Sometimes a route file is used together with a handheld data collector or other mobile device. In this case, the mobile device typically includes an expansive display and other user interface that may be used to guide or instruct an operator concerning a route sequence. The device may be used to assist the operator with near field communication to the digital transducer 10 for configuring the transducer. It may assist the operator by displaying or otherwise confirming a measurement associated with a route, list, or other measurement point identification. It may also be used to receive at least a portion of the measurement information from the digital transducer by way of wireless or bus hub transfer.

In some embodiments, route file information is transferred directly or indirectly to the digital transducer 10 without any handheld or other mobile device having an expansive display. In these embodiments, the digital transducer 10 is equipped with a location determination circuit 34 (FIG. 2) which implements near field communications to an RFID tag or barcode, GPS location, triangulation, or another location awareness technique. For example, an operator may use a printed list of points to guide a walk-around data collection process and use RFID at various measurement points to identify the measurement locations within a route file. Measurement location identification enables a programmed digital transducer with a route file to self-determine the correct configuration settings for data collection.

For example, the operator may use location identification to identify a particular machine at a particular spatial location within a plant, or a measurement point location on a machine. The machine is identified using an RFID tag (or other location identifier), and programmed logic in the transducer may anticipate that a first measurement is to be at made a first measurement point, the second measurement at a second measurement point, and so forth. Measurement setup information for each measurement point in the route may comprise an oversampled data sampling rate, an $F_{MAX}$, a number of lines of resolution, a sampling interval (e.g., time between collection of sequential measurements), a preferred analog processing technique, a preferred digital processing filtering approach, a preferred digital processing form of decimation approach, and the like.

As discussed above, some embodiments of the digital transducer 10 include a location determination circuit 34 (FIG. 2) which may comprise an RFID reader circuit that can read identification and other information over a range of proximity from very close (less than 1 cm) to relatively far (several meters). RFID may be a traditional approach with induction power harvesting such as by a tag, or RFID may be a customized approach without induction power harvesting on either side of an identity communication process. An example of a customized approach is performing a functional equivalent of a radio frequency identification using a Bluetooth™ or Wi-Fi radio protocol or another radio protocol without depending on inductive power transfer as is often done when using RFID tags.

There are several advantages of using RFID for communication: (1) availability of read/write memory; (2) a power source is required on only one side of the communication; (3) communications are wireless; (4) data and other information can be machine interpreted from a distance, even through paint, grease, mud or other debris; (5) RFID tags may be mounted directly on metal surfaces, typically by use of a ferrite or gap spacing; (6) it is not necessary to touch the monitored asset or the RFID tag; (7) it is not necessary to remove a cap or a connector; and (8) it does not require a complex or expensive infrastructure to support communications between multiple devices or between an RFID tag and a device.

In some embodiments, near field communications are used to transmit data or other information from one dynamic digital transducer 10 to another dynamic digital transducer 10, or from a different device to or from the dynamic digital transducer 10. The transferred data may include speed information, which in turn may be interpreted by programmed logic of the dynamic digital transducer 10 to further determine or select the sampling rate, $F_{MAX}$, number of lines, etc. The transferred data may also be used to trigger the start or stop of data collection or another aspect of dynamic data collection for the remote analysis data collection process.

Figure 5:
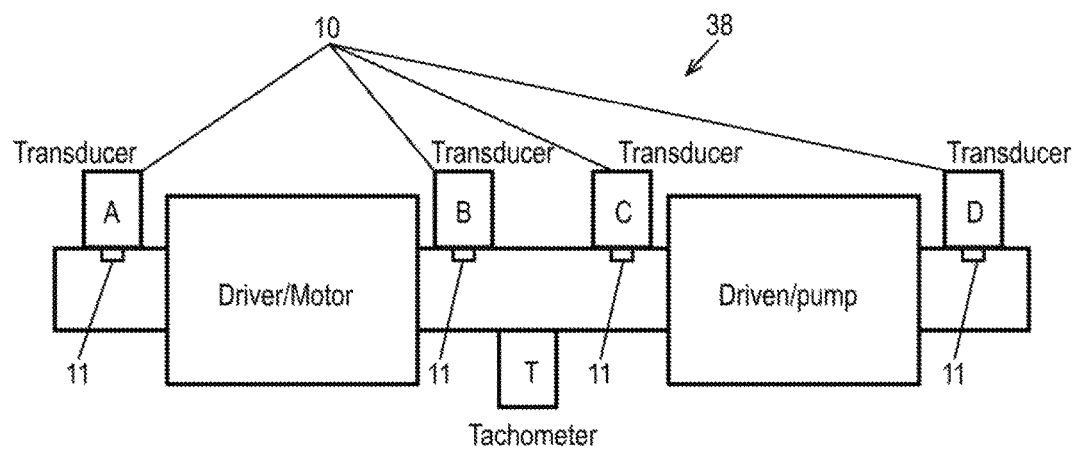
FIG. 5 depicts a functional block diagram of multiple transducers and a tachometer attached to a machine according to an embodiment of the invention.
Figure 6:
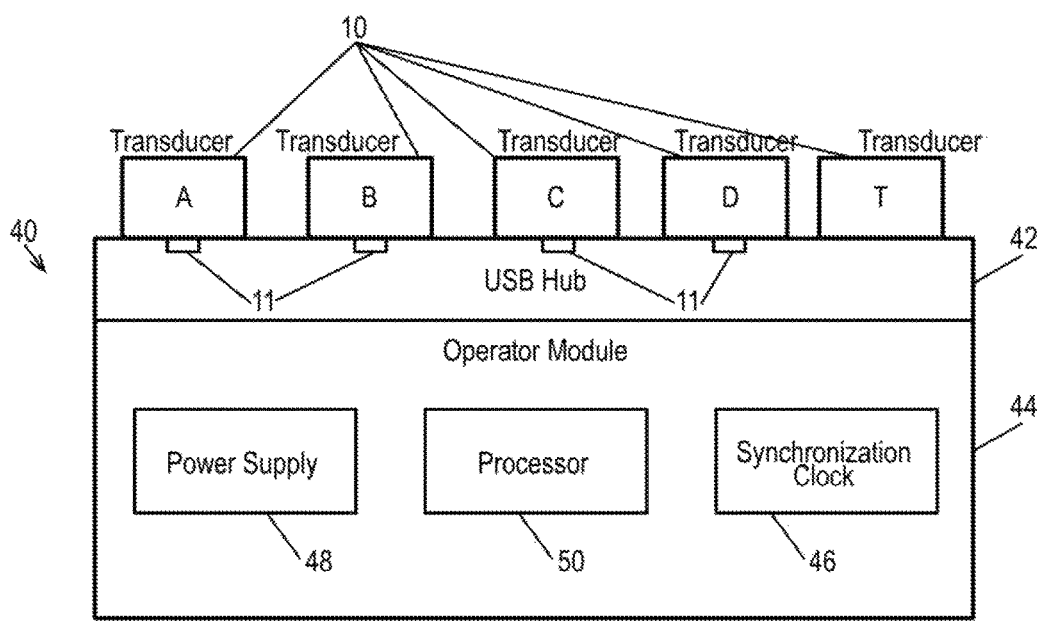
FIG. 6 depicts a functional block diagram of multiple transducers and a tachometer connected to an interface hub according to an embodiment of the invention.

A traditional or a customized RFID approach may support communication of centralized and decentralized data and other information. Location identification, area identification, machine identification, measurement point identification, and sample record identification can be associated with data collected in the field so those data may be associated in a centralized database with respective hierarchical or relational data already in the database. Decentralized data may be stored at the location, the area, the machine, the measurement point, or the sample record using a data storage structure, such as a memory, to enable an operator in the field using a machine reading device to collect machine readable information and to further use and interpret that information in the field. Referring to FIGS. 5 and 6, examples of structures 11 for storing distributed machine readable data distributed in the field include a memory device such as a read/write RFID tag and a paper tag printed with one-dimensional and/or two-dimensional barcodes.

Preferred embodiments of the digital transducer 10 may be configured to be left in place for an extended period of time to collect data multiple times from a single measurement point location. In this case, a route file format or another protocol may be configured in a host computer running machinery analysis software so that a measurement may be collected once per day at 24 hour intervals after an initial data collection is triggered. Thereafter, when an operator places the transducer 10 at a measurement point and triggers the transducer 10 to begin collecting data, it will collect, for example, X, Y, Z, and PeakVue™ data one time per day until it is given different instructions. The operator may periodically collect data from a leave-in-place digital transducer, or swap out the transducer to download data from the transducer memory to storage on a host computer or server. The computer or server may be local or at a remote location such as a remote analysis service location.

In some embodiments, the digital transducer 10 is programmed for a finite number of sequential measurements, such as 100 measurements, and is left in place for a certain duration, such as 90 days. In these embodiments, the digital transducer 10 may serve a "tell-tale" function, in which the digital transducer 10 accumulates measurement sets on a scheduled interval over a relatively long period of time while a machine is operating. From time-to-time, data collected by the digital transducer 10 is downloaded by a bus hub or a wireless device. For example, the digital transducer 10 may be attached to a mobile machine that leaves a service area, performs work, and returns to the service area or to another service location at a much later time. In this embodiment, the transducer 10 may be removed or left in place to download measurement history data indicating what has taken place while the machine has been away. This history may be a record of proper operation or improper operation or abuse of a mechanical system. A record such as this may be used to support or refute a warranty claim, to explain a cause of a damage, or to certify that the machine successfully survived a certain stress or exposure. By accumulating time-stamped digital data in this manner, the data is easily associated with other information collected during the same time interval for complete analysis, interpretation, and explanation.

Figure 3A:
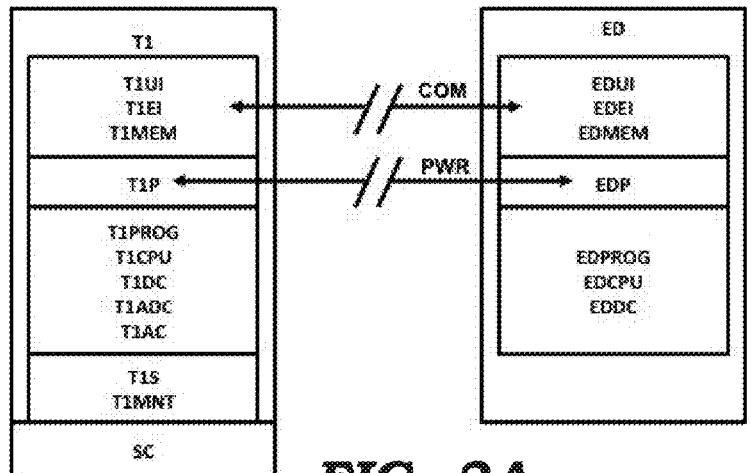
FIGS. 3A, 3B and 3C depict functional block diagrams of a dynamic digital transducer according to alternative embodiments of the invention.
Figure 3B:
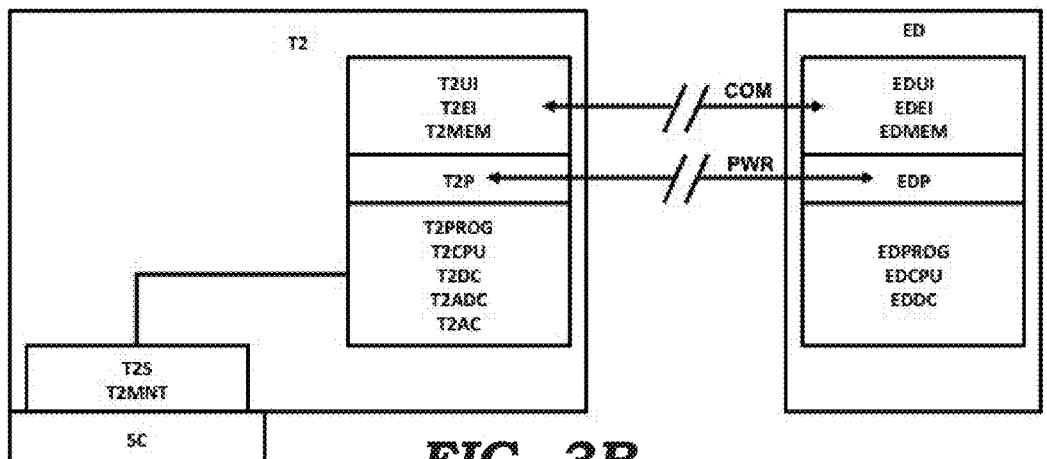
Figure 3C:
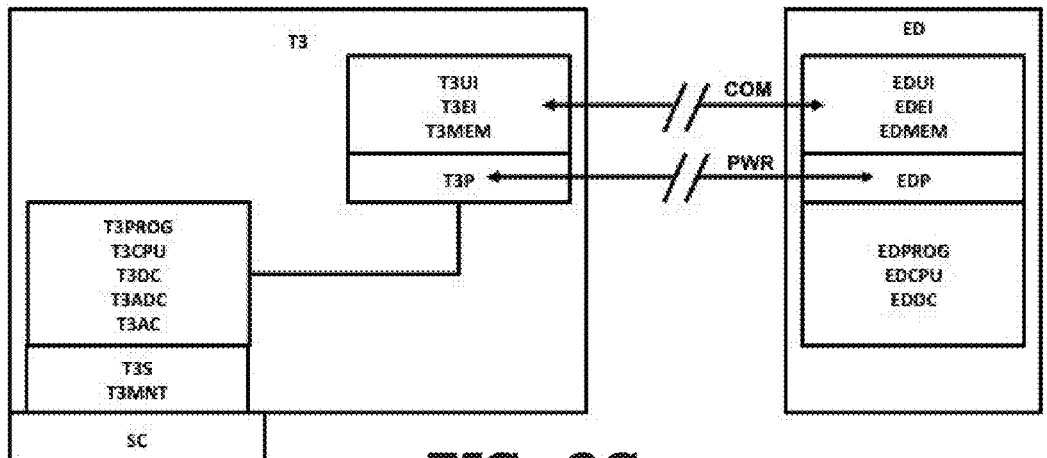

Alternative embodiments of digital transducers are represented as blocks T1, T2 and T3 as shown in FIGS. 3A, 3B and 3C, respectively. Attached to each of these three blocks is a block SC representing a sensory contact with a machine or a process. Block ED represents an external device configuration. Within the transducer blocks T1, T2, T3, and the external device block ED are blocks representing functional components. T1UI, T2UI, T3UI, and EDUI represent respective user interface components. T1EI, T2EI, T3EI, and EDEI represent respective electronic interface components. T1MEM, T2MEM, T3MEM, and EDMEM represent respective memory components. T1P, T2P, T3P, and EDP represent respective power components. T1PROG, T2PROG, T3PROG, and EDPROG represent respective programming/firmware components. T1CPU, T2CPU, T3CPU and EDCPU represent respective processors or central processing unit components. T1DC, T2DC, T3DC, and EDDC represent respective digital circuit components. T1ADC, T2ADC, and T3ADC represent respective analog-to-digital conversion components. T1AC, T2AC, and T3AC represent respective analog preprocessing circuit components. T1S, T2S, and T3S represent respective sensor and sensory components. T1MNT, T2MNT, and T3MNT represent respective mounting or other attachment components. T2L and T3L represent respective links or wires or other connecting components. PWR represents a power connection component. COM represents an electronic interface communication components.

Although preferred embodiments of the transducer 10 has a single housing, in alternative embodiments such as T2 and T3, a transducer or a portion of the transducer is tethered to a second housing that contains a portion of the components, such as a radio, antenna, power supply, or a central processing unit. FIGS. 3B and 3C depict tether sensors T2S and T3S having mounting structures T2MNT and T3MNT for making sensory contact SC with a machine or process component. Although only one sensor is shown in each of these figures, there may be multiple tethered sensors replacing, adding or supplementing the sensor T1S shown in FIG. 3A.

A human-interpreted visual, auditory, or tactile perception device, such as T1UI or T2UI or T3UI, may be associated with or designed into the housing to assist an operator with data collection and to allow an operator to readily differentiate between multiple transducers and their orientations when mounted on a machine. For example, red, green, blue, yellow, and black transducer housings may be employed. In some embodiments, a geometric pattern or another recognizable configuration may be employed. These things assist an operator with first, second and third placements on a machine, such as a motor driven pump, where there are multiple locations for placing transducers, such as motor outboard, motor inboard, pump inboard, and pump outboard point locations. These visual devices also assist with alignment or other orientation of a transducer with a machine orientation or with a mounting pad. An associated perception device, such headphones, a belt clip, or a handheld or a stationary device may physically separate a human perception device from a transducer housing by transmitting a wireless signal via near field communication (NFC), IrDA, a radio signal, a capacitance, a magnetic flux, or another transmission type.

The sensors T1S, T2S, or T3S may be dynamic sensors that measure fast-changing characteristics of a machine or a process. Examples of fast-changing characteristics are machine vibration, motor current signature, and event signature. Examples of dynamic characteristics include acceleration vibration, velocity vibration, displacement vibration, acoustic emission, ultrasonic emission, ultrasonic vibration, stress wave, sonic emission, electrical current, and electrical voltage. Examples of not-dynamic characteristics include relatively slowly changing temperature or relatively slowly changing RMS voltage.

One or more of the dynamic sensors T1S, T2S, and T3S are positioned to make sensory contact with a machine or machine component. An exemplary dynamic sensor is a single-axis acceleration sensor, such as an accelerometer derived from piezoelectric material. Such sensors are preferably designed for monitoring a frequency range of interest and amplitude range of interest to ascertain a particular characteristic, such as a machine vibration of interest or a stress wave characteristic of interest. An example of using more than one dynamic sensor is a combination of three mutually orthogonal (e.g., triaxial) acceleration sensors. A triaxial array of accelerometers may comprise three piezoelectric sensors or possibly an array of MEMS accelerometers. Other examples of dynamic sensors include current clamps and other electrical current or voltage signature analysis sensors, velocity sensors, eddy-current probes and other types of displacement sensors, acoustic emission sensors and other types of ultrasonic sensors, microphones and other types of sonic sensors, load cells, strain gages, pressure sensors, and other sensors intended for characterizing a dynamic characteristic of electrical or mechanical or electromechanical equipment. Preferred embodiments of dynamic transducers are intended for monitoring and measuring conditions such as normal versus abnormal operation or such as a fault of interest correlated to an imbalance, a misalignment, an impacting component, a looseness, a soft foot, an inadequate lubrication condition, a bent shaft, a slipping component, and a rubbing interface. The sensors T1S, T2S or T3S may assembled or otherwise fixed by a mechanical interface T1MNT, T2MNT or T2MNT to the housing to allow a sensory contact as needed, such as to receive and responsively measure a high frequency vibration of interest or a low frequency vibration of interest.

Analog signal pre-processing circuits T1AC, T2AC, T3AC are employed ahead of the ADC's to perform preprocessing of a dynamic analog sensor signal before that signal is transformed into a digital signal. There are multiple pre-ADC analog processing procedures employed in preferred embodiments, such as processing for vibration analysis, preprocessing for PeakVue™ vibration analysis, and preprocessing for selective decimation techniques described in U.S. patent application Ser. No. 14/252,943 filed Apr. 16, 2014, the entire contents of which are incorporated herein by reference. Performing pre-ADC pre-processing by one procedure or another, or by first one procedure and then another, is selected as needed for intended uses.

The ADC components T1ADC, T2ADC, T3ADC, may operate at a default or a designed fixed-frequency sampling rate, $F_{Sampling-Rate}$, and preferably incorporate a high order S-D, SAR or another noise shaping technique.

In preferred embodiments, the ADC components oversample at a fixed frequency, wherein the measurement signals are preprocessed, analog-to-digital processed, and post-ADC processed at the fixed frequency sampling rate. This data is buffered into the transducer memory using first-in-first-out (FIFO), last-in-first-out (LIFO), sample and hold, or other technique as appropriate to collect and transmit a complete set of timestamped sampling rate frequency digital data for processing in a handheld analyzer or other analyzer. In certain embodiments the sampling rate frequency data is buffered and transmitted in packets using a Bluetooth, Wi-Fi, or other wireless communications protocol while the transducer 10 is mounted in place on the machine. In another embodiment, the sampling rate frequency data is completely stored and transmitted later by wired or wireless connection to an analyzer for subsequent processing and analysis. To reduce file transmission size, some embodiments include the decimation processor 29 to arbitrarily decimate or selectively decimate the data, including the oversampled analysis as described in U.S. Pat. No. 9,778,080.

The digital processing circuits T1CPU, T2CPU, T3CPU perform real-time post-processing of the signals coming from the ADC's. Multiple processing procedures are employed in preferred embodiments, such as digital processing for vibration analysis, digital processing for PeakVue™ vibration analysis, and digital processing for decimation or selective decimation techniques. Performing post-ADC processing by one procedure or another, or by first one procedure and then another procedure, is selected as needed for intended uses. Table 1 below compares an analog sensor, such as an accelerometer (Row A), with a digital transducer as described herein (Row B) and a digital analyzer (Row C). It should be noted that post-processing and decimation steps performed on digital data streams produced by an ADC may be performed either in the digital transducer 10 or in a separate digital analyzer. This "TBD" option is by design and choice.

TABLE 1

Process for interpreting analog sensor signal information

|   |   | Analog Signal | Pre-Process | Digital signal | Post-Process | Decimate | Analyze | Interpret |
|---|---|---|---|---|---|---|---|---|
| A. | Analog sensor | Yes | | | | | | |
| B. | Digital transducer | Yes | Yes | Yes | TBD | TBD | | |
| C. | Digital Analyzer | | | | TBD | TBD | Yes | Yes |

A preferred circuit apparatus for accomplishing analog preprocessing (T1AC, T2AC, T3AC) analog-to-digital conversion (T1ADC, T2ADC, T3ADC) and post-processing (T1DC, T1CPU, T2DC, T2CPU, T3DC, T3CPU) of vibration signal information is disclosed in U.S. Patent Publication No. 2012/0041695A1 entitled INTEGRATED VIBRATION MEASUREMENT AND ANALYSIS SYSTEM (hereinafter "Baldwin"), the entire contents of which are incorporated herein by reference. Analog preprocessing or digital post-ADC processing may provide a mathematical translation of the vibration signal, such as by one or more differentiation routines or integration routines as desired to achieve a desired displacement, velocity, or acceleration signal.

Figure 4:
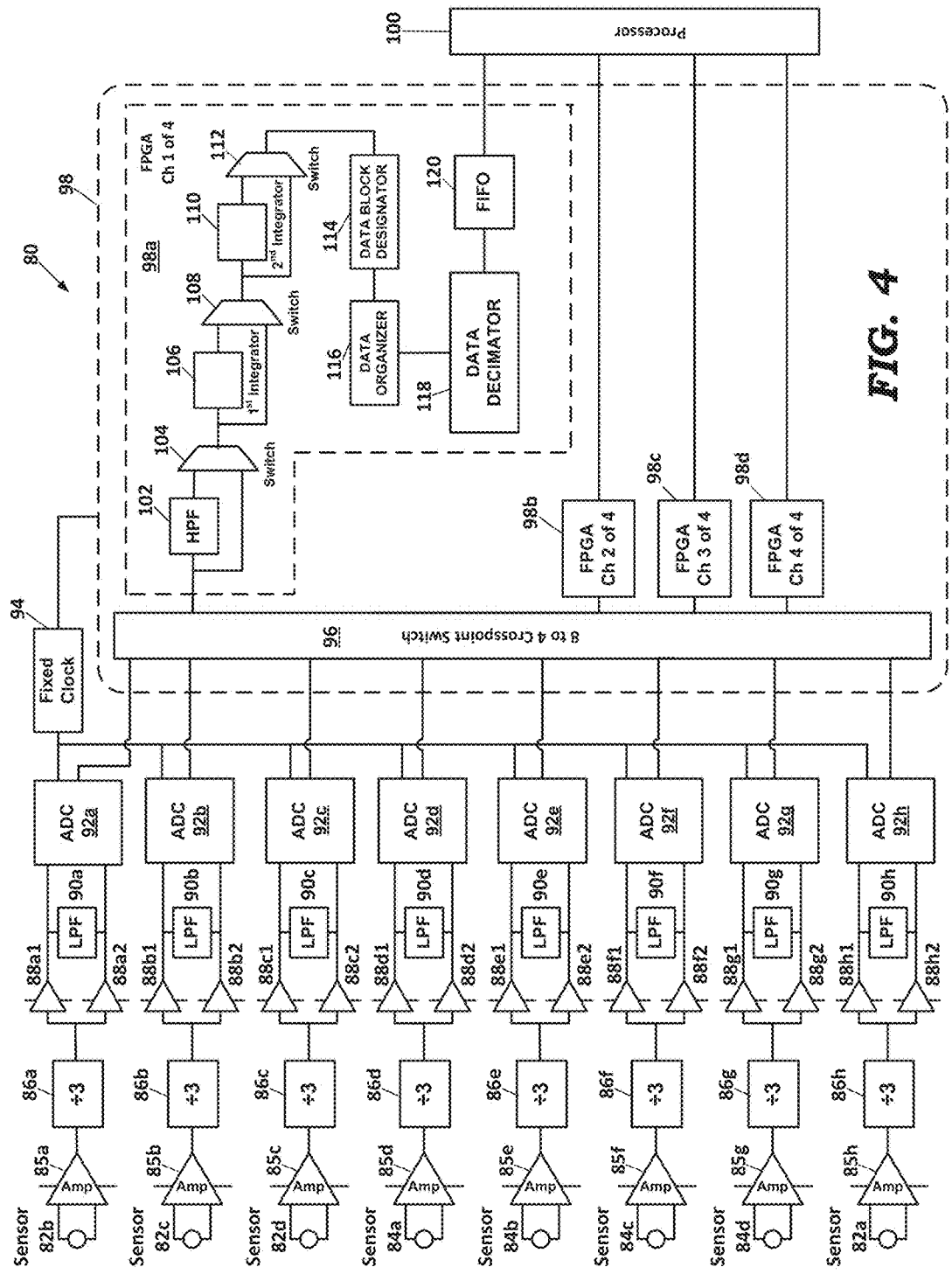
FIG. 4 depicts a functional block diagram of parallel field programmable gate arrays for processing dynamic digital data according to an embodiment of the invention.

In some embodiments, the digital transducer 10 may function as a digital recorder having one or more parallel memory records such as may be implemented in flash memory. Data contained in the one or more memory records may be transferred to a CPU processor or a DSP processor for further processing. In a preferred embodiment, the further processing is performed in parallel channels of a field programmable gate array (FPGA), such as the FPGA 98 depicted in FIG. 8 of Baldwin, which is incorporated herein as FIG. 4 showing channels 98a, 98b, 98c and 98d. In the embodiment of FIG. 4, an analog signal may be introduced in advance of the ADC's 92a, 92b, 92c, 92d, 92e, 92f, 92g, and/or 92i. In particular, in a situation in which a three-axis accelerometer (X, Y, and Z axes) is used, and decimated vibration velocity data for all three axes of measurement is desired, and a PeakVue™ signal or other selective decimation signal for the Z axis is desired, the data decimator 118 may be used for this application.

In preferred embodiments, the memory T1MEM, T2MEM, T3MEM stores programmed logic, route file information, digital data, and other information. This memory is not necessarily contained in one device, but may be distributed in multiple components and multiple circuits associated with the digital transducer 10. The memory may store large amounts of data from many different measurement points, or it may be used to buffer the data for a short time until the data are off-loaded after each measurement to another device having another memory capacity. As a minimum, the memory is used to accumulate data at a design sample rate, somewhat independently from a transmission rate that may be slower and potentially intermittent. This accommodates a walk-around batch USB data transfer or a nearly-real-time wireless Bluetooth™ data transfer. The memory T1MEM, T2MEM, T3MEM overcomes some of the technical limitations of Bluetooth™ standard specifications, particularly those related to delivering lossless data, accounting for limitations in timing, continuity of transmission, transmission rate, data packets, spread spectrum operation, interrupted communications, queuing, error checking and correction, and other things that cause variations in communication speed and timing.

The communication interface T1EI, T2EI, T3EI may be implemented as Bluetooth, Wi-Fi, IrDA, or other wireless communication protocol for transferring data to various host platforms, including handheld devices. Some embodiments also include a physical electrical interface, such as a USB port, to provide data communications and/or power.

The central processing units T1CPU, T2CPU, T3CPU facilitate design flexibility and operator selection choices. The programmable logic firmware T1PROG, T2PROG, T3PROG is programmed into the memory to control operation of the central processing units T1CPU, T2CPU, T3CPU in interpreting commands from the user inputs T1UI, T2UI, T3UI which translate to a command, such as "on," "off," "start test," "reset," "power up," and "power down." The firmware can be used to select between normal and PeakVue™ Lite pre-ADC and post-ADC processing. The firmware may provide for automatically or selectively controlling one or more of the following: a buffer memory operation, a radio transmission operation, a radio receiving operation, a message protocol or interpretation operation, a message reply operation, a power management operation, a calibration or recalibration operation, a verification operation, a self-test operation, and a battery test operation. The firmware of a preferred embodiment is fixed in a onetime programmable device, although reprogrammable memory or other reprogrammable integrated circuit designs may be implemented in alternative embodiments.

The power supply T1P, T2P, T3P is preferably contained within the transducer housing and provides electrical power to other components of the transducer. In some embodiments, the power supply is a removable battery, such as a onetime use AA or AAA battery, or a removable rechargeable battery. Some embodiments incorporate a rechargeable power supply such as a rechargeable battery or capacitor. Battery or capacitor size, capacity, cycle life, and storage life are selected to satisfy fitness for an intended use. In some embodiments, the power supply includes a recharging circuit. In an alternative embodiment, the power supply comprises an energy harvesting power supply for at least a portion of the power needs, wherein an available mechanical or thermal or photon or other electromagnetic energy is collected and converted into electrical energy. Power may also be supplied the digital transducer 10 from an external source, such as an AC power line, DC power line, loop power or an energy harvester at least periodically. Power supply placement and selection may be driven by needs for low mass, high stiffness, absence of looseness, and acceptable damping. Some embodiments comprise an external power supply, such as a power supply in a second housing.

Some embodiments include an automatic installation detection capability, such as programmed logic that interprets a signal indicating that the transducer 10 has been securely attached to a machine and is ready to take data. These embodiments include a sensing technique, such as capacitive, conductive, vibration, magnetic, thermal or other sensing technique, to detect either contact with a machine component or a release of a human hand to accommodate an automatic detection and apply programmed logic to trigger logical action.

Some embodiments include a physical mounting interface T1MNT, T2MNT, T3MNT for enabling hands-free operation. For example, U.S. Pat. Nos. 6,598,479 and 6,892,581, incorporated herein by reference, both describe integral magnetic configurations that may be used with or without a mounting pad to transmit acceptable frequency ranges of data with excellent ease of use. Such mounting design configurations take into consideration the ease of use, repeatability of placement, signal transmission, and desired transducer orientation. The above referenced patents address these concerns for a multi-axial sensor configuration.

Figure 1B:
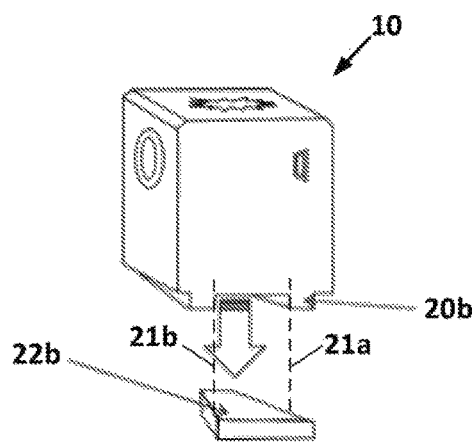
Figure 1C:
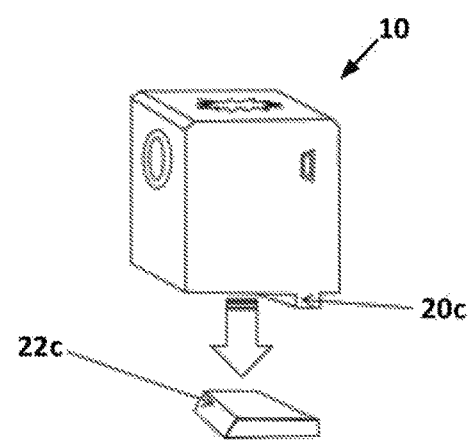

Some embodiments include transducer placement detection capability. When a magnetic transducer mounting configuration is provided as depicted in FIGS. 1A, 1B and 1C, a placement detection capability may incorporate a magnetic flux sensing technique, such as using a Hall effect sensing device 52 (an example of an attachment detection sensor) connected to the DSP unit 30 (FIG. 2) in which firmware detects a change in flux, such as occurs by confining open flux lines when the transducer 10 is coupled with a ferromagnetic machine component or a ferromagnetic mounting pad 22a, 22b, 22c as depicted in FIGS. 1A, 1B and 1C.

Preferred embodiments of the digital transducer 10 provide a standardized and calibrated output. It is desirable for digital transducers to be interchangeable such that one transducer provides similar output to another under similar measurement conditions. For example, it is common practice for analog sensors such as accelerometers to have a nominal output, such as 100 mV/g sensitivity, and it is common for a supplier to provide a calibration curve along with a sensor so that an adjustment can be made to compensate for analog sensor variance between nominal and actual values. A calibration certificate may report an actual sensor is tested to demonstrate approximately linear response, such as 87 mV/g. This information may be used to reduce sensor-to-sensor variations in reproducibility. Preferred embodiments of the digital transducer 10 have electronic component tolerances such that the digital processing portions of the transducer circuit are repeatable and reproducible to within an accepted tolerance. Rather than mV/g, digital transducers typically deliver a digital amplitude value per g of acceleration or whatever measurement is relevant. Furthermore, in accordance with some embodiments, analog piezoelectric sensor measurements are tested and compensated using an analog or a digital adjustment to tune the digital transducer output such that transducers out of the factory box all have a specified output that is within an expected variance from a datasheet specified nominal output. This makes further compensation of the digital transducer outputs unnecessary as is common practice for conventional analog sensors.

An operator using preferred embodiments of the dynamic transducer 10 may sequentially place one transducer on several different machine points. Alternatively, an operator my place multiple transducers and possibly a tachometer on a machine for overlapping, simultaneous, or periodic data collection. FIG. 5 depicts a representation of a machine 38 having a measurement location A at an outboard bearing location on a driver component such as a motor, a measurement location B at an inboard bearing location close to the driver component, a measurement location C at an inboard bearing location close to a driven component such as a pump, a measurement location D at an outboard location close to the driven component, and a tachometer T mounted in a position to monitor a speed, such as a shaft speed. An operator may sequentially place the digital transducer 10 at locations A-B-C-D, collecting data at each location, or the operator may place multiple transducers 10 at the multiple locations.

In some embodiments, the digital transducer 10 may be substituted for the tachometer T of FIG. 5 and provide its functionality. For some embodiments, the digital transducer 10 may provide the functions of an accelerometer, inclinometer, encoder, tachometer, vibration acceleration measurement transducer, or a combination thereof. In these embodiments, the digital transducer 10 collects data while fixed to a rotor or shaft while the rotor or shaft is turning. For example, the digital transducer 10 may be magnetically mounted or otherwise affixed to an outside surface of a rotor shell on a tube mill, autogenous mill, semi-autogenous mill, or another type of tumbling or grinding mill. Such sensor attachment is described in U.S. Pat. No. 6,874,364, the entire contents of which are incorporated herein by reference. Furthermore, signals from an accelerometer may be interpreted by the transducer 10 to indicate precise angular orientation as described in U.S. Pat. No. 6,873,931, the entire contents of which are incorporated herein by reference. Tachometer signal information, speed information, angular information, acceleration information, or encoder information of these embodiments may be stored in memory with a synchronization time stamp. Such information may be transmitted via wireless or wired means to other digital transducers 10 mounted to the rotor or shaft, or the information may be transmitted by wirelessly to a transceiver in another location with synchronization protocol as needed to satisfy time synchronization requirements for the application.

It should be appreciated that the transducer 10 orbiting about a horizontal axis will naturally produce a +/−1 g acceleration signal that passes through zero g acceleration at 90 degrees and 270 degrees from the top position. This signal will have a running speed frequency that is generally known, or is expected to be within a narrow range, and this expectation of a running speed within a narrow range may be used to find and track an angular encoder signal of this embodiment. The derivative of angular position can provide angular velocity and the second derivative can derive angular acceleration. Such application of the digital transducer 10 as an angular encoder is particularly useful in tracking changes in acceleration and deceleration for a turning shaft on a reciprocating engine or compressor where opening and closing of valves impacts torsional acceleration several times during each shaft revolution. Power for a rotating transducer such as this may be provided or supplemented by an internal or external energy harvester, such as a VEH vibration energy harvesting device manufactured by Perpetuum Ltd. of Southampton, UK. In some cases it is practical to derive electrical energy from the same device that detects gravitational acceleration changes in a rotating frame of reference associated with a shaft-mounted or rotor-mounted digital transducer used to encode a tachometer signal, angular position, angular speed, angular acceleration, or other vibration information.

Figure 7:
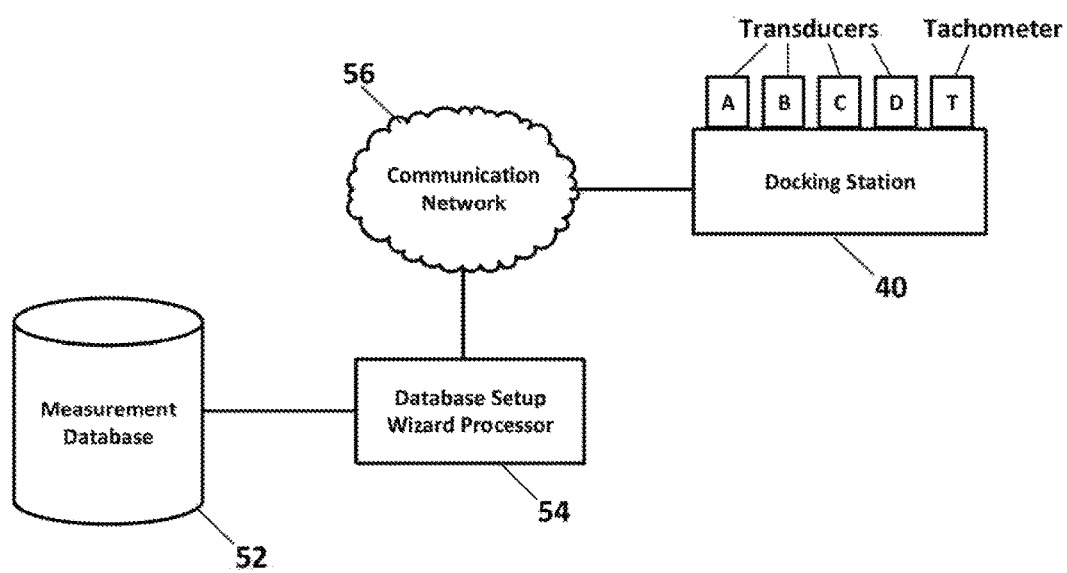
FIG. 7 depicts a functional block diagram of a measurement setup system according to an embodiment of the invention.

FIG. 6 depicts a docking station 40 comprising a bus hub 42 and an operator module 44. In a preferred embodiment, the bus hub 42 is a USB hub. In alternative embodiments, the bus hub 42 is a FireWire hub or another communication hub that provides a communication interface for multiple transducers and electrical power for powering the transducers and recharging their batteries. The transducers (represented by "A", "B", "C" and "D") and a tachometer T are all plugged into the USB hub 42, which is electronically linked to and in communication with the operator module 44. The operator module 44 includes a synchronization clock 46 for time synchronizing the data collected by the transducers, as described below. The synchronization clock 46 may be synchronized with other clocks or pulse-interval-pulse signals, such as GPS signals, the timing signal from the NIST standard clock, or other precisely timed signals. The operator module 44 includes a power supply 48 for providing a charging voltage to the batteries of connected transducers. The operator module 44 includes a processor 50 for controlling the downloading of measurement data from the memories of the transducers and for controlling the uploading of measurement setup parameters to the transducers. As shown in FIG. 7, the docking station of some embodiments is connected to a communication network 56, such as the Internet, through which it communicates with the database setup wizard processor 54.

Although FIG. 5 and FIG. 6 depict use of four magnet-mounted transducers, the embodiments of the invention may incorporate fewer or more than four transducers. In the case of multiple transducers, a synchronization between the multiple waveforms that are simultaneously generated may be accomplished by striping or time-stamping the parallel waveforms. The waveforms may be retained in wave files that are transmitted for further analysis and interpretation.

In an exemplary embodiment, an operator mounts the transducers at the appropriate locations (A, B, C, D) on the machine 38, pushes start on each transducer, and data is collected and stored in the memory of each transducer. If the data record exceeds available memory, then a first-in-first-out (FIFO) or another logical technique can be used to manage memory limitations. After the transducers have collected data, the operator collects the transducers and plugs them back into the charging/communication ports on the bus hub 42 where data is extracted, synchronized, and analyzed by the operator module 44.

The operator module 44 and bus hub 42 provide for precise synchronization of the multiple transducers and tachometer(s) to within a microsecond. Once synchronized, each transducer or tachometer maintains its own clock so that simultaneous data collection can be achieved using time-stamps, count steps, or another chronology trace. Rather than synchronizing the timing before data collection, in some embodiments, data is collected by the independent transducers and tachometer(s), and later the internal clocks are synchronized, thereby synchronizing the parallel data collection that has been collected, is being collected, and will be collected. In this way, any number of synchronized and simultaneous parallel measurements may be made in a plurality of memory devices.

In some embodiments, the transducers are given a synchronization pulse or a synchronization time upon connection to the USB hub 42. This allows each transducer to be adjusted or time stamped, or a time delta can be associated with and published with data stream or waveform records produced by each transducer. Later, when multiple data streams or wave forms are assembled in a database or at an analyzer, the data streams or wave forms can be chronologically aligned within a predictable tolerance of error, regardless of a delay or timing difference that may occur during or after data transmission. In another embodiment, a trigger pulse, synchronization signal, or the passing of data from one transducer to another, or from the USB hub 42 or from another host device to the transducers may be used for synchronizing data depending on memory and bandwidth limitations.

Some embodiments provide for wireless triggering of a start or stop of data collection or data retention. Using wireless communication protocols, such as Bluetooth or Wi-Fi, a wireless communication from another transducer, a handheld data analyzer, or an on-line device may be used to trigger the start or stop of data collection or to control a memory buffer, typically for all channels in all transducers and tachometers instantaneously or at about the same time as needed. Normally this requires all transducers and tachometers to be in sensory contact with a machine before a trigger to start data collection is accomplished. However, there are circumstances in which a trigger, such as a synchronizing step, may be offset earlier or offset later than a data collection start or stop, provided media such as one or more memory buffers accumulate data for at least a measurement interval of interest. For vibration analysis, an interval of interest is typically based on a maximum frequency of interest, $F_{MAX}$, and a number of averages with a percent overlap.

In embodiments in which precise synchronization of clocks has been accomplished for all transducers and tachometers, a physical button push by an operator may initiate data collection, possibly after a measurement settling time. In other embodiments, each transducer may detect its mounting position by sensing a material, by sensing a vibration status, or by sensing another characteristic that is perceptible by the transducer. When transducers and tachometers are triggered to begin data collection at different intervals, they typically continue to collect data and send it to buffered memory for at least a predefined interval or until an operator triggers the transducer or tachometer to cease collecting data.

Some embodiments include an initialization procedure in preparation for initiating a data collection process using the digital transducer 10 in a walk-around data collection program. This procedure is particularly important when using the digital transducer 10 without a handheld data collector. The initialization procedure may include one or me of the following steps:

a. Identifying a set or a list of machines to be monitored using the digital transducer based on a priority, a severity, a criticality, a reliability, or another selection logic.

b. Walking around in the field where equipment is located with a camera and a clip board or note pad and note information about machines in the set of machines.
  i. Taking a picture of nameplate information and or record information from the nameplate including rotating speed information, equipment information, and operating information.
  ii. Taking a picture or becoming familiar with locations where measurements are likely to be collected and familiar with machine components such as bearing housings, shaft couplings, belts and gearboxes, and other power transfer apparatus, drivers, and driven components.

iii. Preparing a surface if necessary at each measurement location. For example, it may be advisable to clean or grind a position such as a horizontal measurement point location on bearing housings where measurement pads may be physically attached.

iv. Taking a picture of each pad with sufficient surrounding area exposed so that a new operator can easily distinguish each measurement point location using a copy of at least a portion of the photograph.

v. Attaching or taking note of a location awareness marker that may be used by an operator during an inspection or a route. The location awareness marker may be an RFID tag, a barcode or another distinguishable marking that can be found by an operator and interpreted by the operator or by near field communications within the digital transducer or both the operator and the transducer. The location awareness markers may be in a vicinity of or on or otherwise associated with a measurement point location, a component, a machine, or a group of machines.

vi. Proposing a logical sequence for data collection routing and entering that logical sequence into a computer, web portal, or another device wherein a route file or other configuration file provides structure for a data collection process and properly configuring digital transducer setup information used by an operator in a walk-around data collection routine with the digital transducer.

vii. Making notes of safety information and other helpful notes for an operator to safely, effectively, and efficiently perform a route-based data collection process.

viii. Taking steps to implement these things into a process, such as the route file, whereby the computerized devices are used to assure that highly repeatable steps are consistently performed without missing any step, and that steps involving operator judgment and flexibility are easily and consistently accomplished by an operator using the digital transducer.

c. In some embodiments, a remote analysis web portal interacts with the operator performing a walk-around data collection. The remote analysis portal suggests the steps appropriate to a type of measurement routing and prompts the operator to enter results of the walk-around, to enter photographs, notes, and other observations from the walk-around, and to logically construct a process that will guide an operator through an inspection using available tools, including such devices as a handheld data collector, another mobile electronic device with a display, a clip board, or another form of instruction to guide the operator through an inspection using a digital transducer.

In some embodiments, "overall readings" may be used with the digital transducer 10. As the term is used herein, "overall readings" comprise scalar values computed in real-time in addition to detailed digital waveform data. In some embodiments, overall readings are computed within the digital transducer 10 and stored within its memory. The overall readings may be of the operator's choice. In one case, an overall reading may be an RMS overall for a low-frequency portion of a broad spectra. In another case, a different overall reading may be an RMS overall for a relatively higher frequency portion of a broad spectra. Typically, an overall reading is selected to reflect a meaningful measurement such as a machine operating or a machine not-operating status indicator, or a machine normal indication range compared with a machine alarm indication range. Overall readings and other scalar value readings calculated in real-time may be communicated via a distinguishable visible signature such as an LED indication, and/or they may be transferred out of the digital transducer 10 via a wireless communication or by some other means, such as with transfer of measurement records or measurement sets.

In some embodiments, baseline wave files, baseline measurement sets, or baseline spectrum files may be used with the digital transducer 10. Such baselines may be recorded and stored within the digital transducer so that the transducer or another device may readily compare data, overall values, or other scalar values from baseline spectra with other data collected with the transducer. For example, a baseline may be an average of multiple measurements collected with the digital transducer recently or in a history. The baseline may be retained within the digital transducer or may be read into the transducer from another device. A baseline may be used for in-transducer alarming, for triggering a special data collection or measurement configuration/reconfiguration, or for mathematically processing, such as subtracting, adding, multiplying, dividing, or otherwise comparing data values.

In some embodiments, a process for annunciating an alert status is implemented using direct or indirect outputs from the digital transducer 10. Such an alert status may be based on a programmed trip indication derived from a low battery voltage, a measurement alert, a possibly failed measurement sequence, a possibly erroneous circuit operation, or another warning or alerting statement. Annunciation is typically accomplished by using programmed logic in the digital transducer that triggers some form of communication to the operator, such as a change in LED operation, a near field communication message, or a sound or vibration, either from the transducer or from another device triggered in some way by the digital transducer logic.

In some embodiments, a leave-in-place implementation of the digital transducer 10 may use wireless communication of scalar values from the transducer to another device. The other device may be a handheld data collector carried by an operator near to a transducer on a stationary machine, or the other device may be a data collection device placed at a stationary point where mobile equipment travel nearby. In these examples, the physical proximity of the transducer and the other device triggers a transfer of at least a portion of the data from the memory of the transducer to the other device. In addition to measurement information, the data transferred from the digital transducer memory may also include information about the available battery life and available memory of the digital transducer so that the transducer may be recharged or have its memory transferred to prevent loss of meaningful data or other information.

In some embodiments, sound files may be produced from wave files or sets of wave files created by the digital transducer 10. Sound files may be heterodyned or processed by other means if necessary to bring out-of-range frequency information into a human audible range. Sound file information may be extracted from waveform information and played audibly through one or more speakers, such as through headphones capable of receiving a wireless signal, such as a Bluetooth signal, so that an operator may compare sound signals to one another. In a preferred embodiment, a sound file is first transferred wirelessly from the digital transducer 10 to a mobile device, and then the sound information is transferred wirelessly from the mobile device to a speaker or headphones. This process removes latency gaps in lossless signal content. The operator may then listen for differences between similar signals from similar measurement points. The operator may also listen for patterns, impacts, or modulations and compare them to discern perceivable similarities and differences.

In some embodiments, the digital transducer 10 drives a strobe light signal using wave file information from the digital transducer. For example, a mathematical process, such as correlation or autocorrelation, may be used to identify frequency patterns within a wave file. In some circumstances, the time domain information may be converted into frequency domain information. By whatever technique is selected, a characteristic frequency that is identified within a digital transducer may be transmitted to a strobe light, and that characteristic frequency and/or its harmonics may be used to pulse the strobe light to find machine components matching that precise frequency.

Some embodiments employ skip processing data collection wherein two or more data collection intervals are separated by a time interval. For example, a microprocessor instruction may prompt a first data collection during a first interval beginning at a first point in time "A" and a second data collection during a second interval beginning at a second point in time "B." Skip processing may include three or more intervals which may overlap or may be separated by large time intervals. In some embodiments, skip processing is implemented to conserve memory. In some embodiments, skip processing is used to monitor multiple machine states, such as a forward movement and a backward movement, a compression and a tension, a baseline measurement and an in-service measurement, a first speed and a second speed, or a first load and a second load. Skip processing may be used to accommodate a background measurement of vibration with no energizing of a structure by an impact hammer, and an energized measurement associated with a mechanical blow from an impact hammer. Skip processing may be used to accumulate a series of measurements ("A", "B", "C", etc.) from a route of corresponding sampling points. Skip processing may be used to accommodate a first set of measurement or analysis instructions associated with "A", and to accommodate a second set of measurement or analysis instructions associated with "B", and so forth.

In some embodiments, data collected by skip processing are transmitted from the digital transducer 10 by wireless means (Bluetooth, Wi-Fi, IrDA) or a physical connection to a host analyzer. Since data collection rates, such as $F_{Sampling-Rate}$, are typically very high frequencies, such as ~100 kHz, and wireless transmission rates may be accomplished at relatively slower rates, it is an advantage of skip processing that a wireless means, such as Bluetooth, Wi-Fi, or IrDA, may be used during skipped intervals to transmit data from buffer memory in the digital transducer 10 to the host. This allows relatively higher frequency data analysis to be performed in the host rather than in the digital transducer. Data transmission over a wired connection, such as USB, fire wire, or another high speed data transfer protocol, is sometimes faster than wireless data transmission provided it is convenient to make a wired connection with the digital transducer. "Thumb drive transducer" conveys a mental image of the wired embodiment in which bulk data are transmitted by physical connection, even if a wireless communication is used for instructing and or triggering one or more aspects of a data collection process.

Simplified data collection is a significant aspect of some embodiments in which a buffer memory onboard or connected to the digital transducer 10 is used to accumulate a full set of $F_{Sampling-Rate}$ data. For simplified vibration data collection, oversampled digital data is collected at sampling rate for a triggered interval or duration of time. The triggered duration of time for simplified data collection is selected, entered or defaulted. Selection may be from a list such as 0.1, 0.5, 1, 2, 5, 10, 20, 40, 60, 180 seconds. An entered value may be typed into a communication device, such as an analyzer or other mobile device, and transmitted by a wireless, wired, or other communications media to the digital transducer. A default duration may be a value that satisfies a range of applications of interest with acceptable use criteria considering human centered design, battery life, memory, etc. A next step in complexity above simplified data collection typically involves a data compression step, such as a decimation step or a selective data reduction technique, which may call for a selection, specification, or default for a sampling duration that is typically based on information about a machine of interest.

Preferred embodiments involve simplified instructions, such as collection of full sampling rate digital data for a fixed duration on a variety of machines. For example, a fixed collection time of 3 seconds may be determined to be adequate for a vast majority of machines, perhaps with the exception of a small number of slow speed machines. Slow speed machines may involve collection over a longer period, such as for 30 seconds, perhaps using a distinguished or otherwise different data collection device or data collection setting. This "standardized" or "simplified" approach to data collection is intended to make the process easy and foolproof. In such approach, much more than enough data is collected, which simplifies the data collection process. However, the extra data requires more resources for collection, storage, and transmission to a remote server where it must be further processed to provide useful information. Typically, that further processing at the remote server reduces a dataset to that portion that is actually needed for analysis.

Modern imaging analyzers, such as infrared cameras and visible cameras, may be configured for inspections and may be programmed to interpret and analyze digital data collected by various embodiments of digital transducer 10. In one embodiment, the operator module 42 (FIG. 6) comprises an imaging analyzer, such as described in U.S. Pat. No. 7,561,200 (Garvey), the entire contents of which is incorporated herein by reference.

When a preferred embodiment of the digital transducer 10 is used in association with a remote analysis activity, the data is collected in one location and analyzed in another location. In addition to transferring measurement data files, a route file protocol or another transfer file may be used to communicate additional meaningful information unidirectionally or bi-directionally between the remote analysis computer (or remote analyst) and the digital transducer or another device used in association with the operator of the digital transducer. Examples of additional meaningful information include notes, observations, findings, transducer identity, operator identity, machine identity, measurement point identity, measurement configuration information, and baseline data.

Preferred embodiments are intended for useful application by an operator in vicinity of machinery, such as by a plant maintenance technician who collects data using the digital transducer 10 on a scheduled route. For example, see Table 2 for a sequence in which preferred embodiments of the digital transducer 10 may be employed in remote analysis services, whereby the technician who collects data is near a machine. The analyst who analyzes the data may be in a location remote from the machine, and the recipient of analyzed results may be in yet another location. Table 2 is presented for example only and should not be considered comprehensive or exclusive in the order the steps are performed.

TABLE 2

Remote analysis services using the present invention.

| | |
|---|---|
| A | Remote analysis services employing the present invention |
| B | Operator receives a transducer, mounting pads, and a DVD or other means for instructing |
| C | Operator accesses a computer website to access a database setup wizard processor |
| D | Use the database setup wizard processor to guide the operator or his representative with setting up a database |
| E | Motor outboard horizontal, axial and vertical measurement location(s) |
| F | Motor inboard horizontal and vertical measurement location(s) |
| G | Pump inboard horizontal and vertical measurement location(s) |
| H | Pump outboard horizontal, axial, and vertical measurement location(s) |
| I | Repeat steps E through H for all the machines in a route |
| J | Repeat steps E through I for all the routes in a database |
| K | Mount pads on measurement points |
| L | Print a or download route information to guide the operator through a data collection route |
| M | Walk the route collecting data using the digital transducer |
| N | Receive visual or audible feedback when a measurement is complete and data is in memory |
| O | Upload the route information to the PC or web server for further processing and analysis |
| P | Process the data through an expert system such as CSI Nspectr ™ or DLI Expert Alert ™ |
| Q | Programmed logic processes expert system findings for review and analysis by a human expert |
| R | Findings are reported to the plant following practices common to the remote analysis industry |

Remote analysis capabilities expand the opportunity for providing excellent machinery condition monitoring, particularly employing transducers capable of dynamic signal analysis, such as vibration analysis, motor flux or current analysis, stress wave analysis, and analyses using human vision and/or using imaging devices with visible and/or thermographic sensors. These capabilities can be made available to manufacturing plants from which an experienced analyst is leaving or has left, and to plants where it is not convenient to have an experienced analyst.

As shown in FIG. 7, some embodiments include an measurement database 52 for storing and analyzing data collected using the digital transducer 10. Database setup is may be accomplished using a database setup wizard processor 54, which may be accessible via a communication network 56 such as the Internet. One prior art example of a database setup wizard suitable for assisting an operator with creation of an measurement database for storage and analysis of machinery condition measurement data, findings, observations, recommendations and corrective actions is described in U.S. Pat. No. 6,192,325 ("Piety '325"), the entire contents of which are incorporated herein by reference. A commercial example is the Database Wizard software module of the AMS Suite: Machinery Health™ Manager software from Emerson Process Management. Embodiments of the present invention are distinguished from these prior art references in at least the following ways:

Data collection typically comprises collection of standardized bulk data, which is later formatted for analysis after it is stored in a remote server.

$F_{MAX}$ and the number of lines of resolution, if used, may be applied in a remote server and not applied to restrict data collection.

Embodiments of the present invention typically collect standardized packets of data and information, which is in effect for longer times and in greater volume than what is needed.

In many cases, oversampled data is not reduced to analyzed information until it is processed in a remote server.

An expert system, such as Emerson's NSPECTR® or DLI's Expert Alert, are typically not performed until data is received at a remote analysis server.

Programmed logic executed on the database setup wizard processor 54 preferably incorporates components described in Piety '325, including the design studio, component warehouse, knowledge base, and inference engine, such that the operator is guided through a standardized process for creating a database.

Preferred embodiments of the database setup wizard processor 54 include programmed logic that generates a file to guide an operator through a route, which file may be printed by someone at a plant site or uploaded to an electronic device having a display, such as a PDA, tablet computer, or smart phone. The database setup wizard processor 54 preferably generates a set of instructions for an operator at a plant site to prepare for collection of data in the plant site. For example, the database setup wizard processor 54 may provide a form or file that effectively instructs the operator where to glue simple steel pads for mounting the digital transducers 10. Optional application of mounting pads, such as steel pads 22a, 22b, 22c (FIGS. 1A-1C), at suggested locations is intended to achieve reproducible data by operators having a little experience or extensive experience.

Preferred embodiments of the present invention are highly scalable such that plants and corporations may begin with small evaluations and rapidly grow. This is enabled by standardization, cost reduction for devices, and improved service efficiency using programmed logic for highly repeatable and predictable steps, and using human analysis for review and interpretation of results by exception. Exceptions that require a human analyst typically include "everything went red" situations which often occur when an outside-of-common-practice application is encountered. For example, when a standardized remote analysis service encounters measurements that are not customary, alarms are frequently triggered on a large number of measurements. This is likely to get the attention of an operator who must review the data to sort out what went wrong with either a remote analysis procedure or with a machine. For example, a crusher gearbox may be selected by a representative of the customer. If such a machine is unlike anything in the knowledge base or the inference engine, the database setup wizard processor 54 may prompt a person to step in and assist with database creation.

Some embodiments may involve a service provider that provides hardware to a user of the service. If compensation for the service is based on usage, fee payment, or another measurable characteristic, the hardware devices that have been loaned by the service provider may subsequently be de-activated automatically if such fees, payments, or usage is not satisfied. For example, if a loaned device is not either returned or placed under fee-based support within 90 days or 1000 measurements, it may automatically become unusable without an extension or renewal. A "turn off" feature like this may be programmed into the device at the factory.

Alternatively, a customer may find that remote analysis service is not provided by the portal, so effectively a serialized device may not be functional because the host portal will not engage the representative or operator who is failing to compensate the service provider or otherwise is not fulfilling an obligation.

Mining, Construction, Drilling, Oil and as Applications.

Some embodiments of the digital transducer 10 are particularly useful for mining, construction, drilling, oil and gas applications including, but not limited to, conveyors, drills, haul trucks, loaders, shovels, drag lines, hydrocyclones, autogenous mills, semi-autogenous mills, other tumbling or grinding mills, continuous miners, rail cars, tracked and wheeled vehicles, fans, compressors, motors, engines, power transmission systems, gearboxes, hydraulics, transformers, and circuit breakers. Advantageous aspects of the digital transducer 10 for such applications derives from one or more of the following characteristics:

Integral magnetic mount—The magnetic mounting structures 20a-20c and 22a-22c facilitate firm, quick and easy placement and removal and provide excellent physical signal transmission path from a surface on an object of interest to the sensor within the digital transducer 10.

Small, rugged, compact, tested and certified packaging— The housing 12 facilitates rated, such as hazardous or other, dependable service.

Battery operation or line power operation—Embodiments of the digital transducer 10 may be used in convenient and inconvenient access locations. In some applications they may be left in place for a long time, and in other applications they may be picked up immediately after data is collected and stored in memory.

Memory for storage of one or many measurements—The memory 32 facilitates route-based data collection, leave in place and pick up later data collection, and it wireless transmission of information over short or long distances.

Digital data—The fact that analog signals are collected, translated into digital information, and stored in memory, allows the data to be transmitted between multiple locations and reassembled at a later time and another place in a lossless format.

Wireless—Because preferred embodiments of the digital transducer 10 are wireless, they may be installed and function without the limitations of analog cabling. This is a big advantage for many of the abovementioned applications. For example, in a rotating tumbling or grinding mill, digital transducers may be mounted on the shell of the mill, such as using mounting pads 22a-22c interfaced with the integral magnet 20a-20c. Such transducers may transmit by wireless means, such as Bluetooth, Wi-Fi or another means, to a transceiver that further transmits digital output information directly or indirectly to a control station that controls one or more aspects of the process. In this case, the digital transducer 10 may use selective decimation techniques to identify one or more moving material process characteristics that are relevant to an aspect of the control process and/or control system.

Hands-free—The hands-free aspect of preferred embodiments of the digital transducer 10 makes it attractive for use in many hazardous or otherwise difficult applications. For example, the transducer may be placed on a machine, the machine may then move while data is collected, and the transducer may be removed after the machine has stopped moving and it is again convenient and safe.

Move out and move back and move on—In many of the applications mentioned above, there is a move out and move back aspect, such as conveyors, shovels, mills, trucks, rail cars, etc. Embodiments of the digital transducer 10 are particularly convenient and applicable for these applications in which an operator may be at one location and equipment comes to the operator. Alternatively, the operator may periodically arrive at an equipment location.

Fleet service applications—Embodiments of the digital transducer 10 are particularly conducive to fleet service applications, which is an aspect of many applications named above and other applications. Route-based data collection techniques may be effectively used or modified for use in fleet service applications. Fleet service typically implies that a plurality of similar applications under similar service is managed, studied, and maintained using data collected across the fleet. Standardization, repeatability, configurability, re-configurability, and elimination of human error from many different operators performing the same task make the digital transducer 10 particularly useful for fleet applications.

Safety in hazardous environments—Preferred embodiments of the digital transducer 10 are typically not cabled or connected or opened during data collection. If connections are made, such as to a USB port, it can be done in a safe location, such as outside an area where explosives are in use. The self-contained, rated, multiple-point data collection capability of the digital transducer 10 makes it particularly useful in hazardous environments. When a companion tool is needed to guide an operator through a route of data collection and annotate the operator's progress, that tool may be an independent safety-rated device, such as a printed paper checklist and a marking pen.

Intuitive—One aspect of the digital transducer 10 that makes it particularly helpful to operators in mining, construction, oil rigs, and other places where operators' experiences are in a field different from that of an expert non-destructive testing technician, is the fact that the digital transducer 10 is purposeful and intuitive to use. An operator may simply put it in place at one measurement point and wait for an LED or other display on the housing to indicate when it is time to remove the transducer 10 and move to the next measurement point. The measurements to be performed by the digital transducer 10 may be specifically preconfigured, thereby requiring little operator knowledge and input while on the measurement route.

Selective decimation—As discussed elsewhere herein, an aspect of the digital transducer 10 that makes it particularly useful in the applications listed above is the ability to selectively decimate an oversampled digital signal. The decimation process is useful in finding causal events within oversampled digital signals, so that an attribute or a scalar value may be reported characterizing the causal event. The ability to identify a causal event, such as impacting, friction, malfunction, interruption, stopping or starting, or one of many other non-parametric contributions, is helpful in the applications mentioned above.

Remote—Using preferred embodiments of the digital transducer 10, monitoring, analysis, and control aspects may be performed remotely. By eliminating analog signal transmission lines, preferred embodiments provide previously-unavailable options for remote monitoring, remote analysis of data from the transducer and from independent sources such as process transmitters, and for remote control of a process, machine or component. Digital data from the digital transducer 10 may be distributed anywhere in the world very quickly. In prior cabled monitoring systems, one break in an analog cable destroys its function. However, with the digital data transmission provided by the transducer 10, the signal can be sent in packets with retries and error checks to provide a comprehensive set of generally lossless data in a reasonable timeframe for decision and control. This aspect is highly advantageous to many of the applications named above.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A portable digital transducer for collecting dynamic measurement data associated with one or more machines or processes, the portable digital transducer comprising a dynamic analog sensor for generating an analog sensor signal based on measurements of dynamic characteristics of the one or more machines or processes, an analog signal processing circuit for preprocessing the analog sensor signal before conversion into a digital signal, an analog-to-digital conversion circuit for oversampling the analog sensor signal at a sampling rate to generate oversampled dynamic digital measurement data, and a decimation processor programmed to derive at least two synchronized datasets from the oversampled dynamic digital measurement data, the at least two synchronized datasets comprising a first dataset resulting from filtering and nonselective decimation of the oversampled dynamic digital measurement data, and a second dataset resulting from filtering and selective decimation of the oversampled dynamic digital measurement data, the portable digital transducer further comprising:
    a memory device for storing the at least two synchronized datasets until the at least two synchronized datasets are transferred to an external device, the memory device further for storing route information that indicates a route of measurement locations at which the portable digital transducer is to collect the dynamic digital measurement data;
    a digital signal processing circuit controlling the portable digital transducer in collecting the oversampled dynamic digital measurement data and storing the at least two synchronized datasets in the memory device in multiple data groups with information associating each data group, the digital signal processing circuit accessing the route information from the memory device for controlling the digital transducer in collecting the dynamic digital measurement data at the multiple measurement locations as an operator moves the digital transducer from measurement location to measurement location along the route;
    a communications interface for transferring configuration settings from an external device to the memory device and for transferring the at least two synchronized datasets from the memory device to an external device, the communications interface for receiving the route information from the external device;
    a power source for powering the portable digital transducer to collect and store the dynamic digital measurement data, and maintain the at least two synchronized datasets in the memory device until the at least two synchronized datasets are transferred to the external device; and
    a portable housing in which the dynamic analog sensor, analog signal processing circuit, analog-to-digital conversion circuit, decimation processor, digital signal processing circuit, memory device, communications interface, and power source are disposed, the portable housing configured for cable-free data collection.

2. The portable digital transducer of claim 1 wherein the housing further comprises a quick-disconnect mounting means comprising an attachment and alignment mounting device selected from the group consisting of a planar attachment device and a conical attachment device.

3. The portable digital transducer of claim 2 wherein the planar attachment device comprises:
    a first substantially planar outer surface for making intimate contact with a first substantially planar contact surface of a mounting pad attached to the surface of the machine or to the surface associated with the process; and
    a second outer surface extending at a first angle from the first substantially planar outer surface of the housing for making intimate contact with a second contact surface of the mounting pad, wherein the second contact surface extends at the first angle from the first substantially planar contact surface of the mounting pad.

4. The portable digital transducer of claim 3 wherein the first angle is a right angle.

5. The portable digital transducer of claim 3 wherein the first and second outer surfaces of the mounting means comprise a magnetic material, and the first and second contact surfaces of the mounting pad comprise a magnetically attractable material.

6. The portable digital transducer of claim 3 wherein the first and second outer surfaces of the mounting means comprise a magnetically attractable material, and the first and second contact surfaces of the mounting pad comprise a magnetic material.

7. The portable digital transducer of claim 3 wherein the quick-disconnect mounting means of the housing comprises a third outer surface extending at a second angle from the first substantially planar outer surface of the housing for making intimate contact with a third contact surface of the mounting pad, wherein the third contact surface extends at the second angle from the first substantially planar contact surface of the mounting pad.

8. The portable digital transducer of claim 7 wherein
    the second outer surface of the housing intersects the first substantially planar outer surface of the housing along a first substantially straight line, and
    the third outer surface of the housing intersects the first substantially planar outer surface of the housing along a second substantially straight line.

9. The portable digital transducer of claim 8 wherein the first substantially straight line is parallel to the second substantially straight line.

10. The portable digital transducer of claim 8 wherein the first substantially straight line is not parallel to the second substantially straight line, the first substantially planar outer surface of the housing is trapezoidal, and the first substantially planar contact surface of the mounting pad is trapezoidal.

11. The portable digital transducer of claim 1 wherein the housing includes a loop for receiving a cord, latch, or hook connected to an elongate rod for use in placing the portable digital transducer in a hard-to-reach measurement location.

12. The portable digital transducer of claim 1 wherein the conical attachment device comprises a tapered cone surface with an alignment feature.

13. The portable digital transducer of claim 1 wherein the memory device stores:
   route information indicating a route of multiple measurement locations at which the portable digital transducer is to collect the dynamic digital measurement data;
   configuration settings associated with each of the measurement locations; and
   the synchronized datasets derived from the dynamic digital measurement data collected from each of the measurement locations, and
the communication interface comprises a Universal Serial Bus (USB) interface that is accessible through the housing, the USB interface for transferring the synchronized datasets associated with the multiple measurement locations to the external device.

14. The portable digital transducer of claim 1 wherein
   the communication interface comprises a wireless radio-frequency interface for receiving wireless signals containing at least a portion of the configuration settings and generating wireless signals containing at least a portion of the synchronized datasets, and
   at least a portion of the housing comprises a material through which the wireless signals can pass,
   whereby the portable digital transducer may receive at least a portion of the configuration settings from a wireless digital data collector and transmit at least a portion of the synchronized datasets to the wireless digital data collector.

15. The portable digital transducer of claim 1 further comprising:
   the digital signal processing circuit for generating instruction signals and status indicator signals; and
   a display device in electrical communication with the digital processing circuit, the display device for displaying visual instructions and status indicators to an operator of the portable digital transducer based on the instruction signals and status indicator signals,
   where the visual instructions prompt the operator to do one or more of:
      attach the portable digital transducer to a particular one of multiple measurement locations;
      activate the portable digital transducer to begin collecting oversampled dynamic measurement data at a particular one of the measurement locations after the portable digital transducer has been attached;
      proceed with the portable digital transducer to a next one of the measurement locations;
      acknowledge a location awareness or location identification; and
   where the visual status indicators indicate to the operator one or more of:
      the portable digital transducer is ready for data collection at a particular one of the measurement locations;
      data collection is ongoing at a particular one of the measurement locations;
      data collection is complete at a particular one of the measurement locations;
      the memory device is full or is almost full;
      data collection is complete for all of the measurement locations;
      the portable digital transducer is not firmly attached to the surface on the machine or a surface associated with the process; and
      measurements indicate the machine or process being monitored is not operating, is not operating normally, or is not operating within an expected range.

16. The portable digital transducer of claim 1 wherein the route information associates each of the measurement locations with a corresponding one of the data groups within the dynamic digital measurement data based on a sequential order in which the data groups were collected pursuant to route information.

17. The portable digital transducer of claim 1 further comprising a user input device operable by an operator to generate an input signal to cause the portable digital transducer to begin collecting the dynamic digital measurement data.

18. A portable digital transducer for collecting dynamic measurement data associated with one or more machines or processes, the portable digital transducer having a dynamic analog sensor for generating an analog sensor signal based on measurements of dynamic characteristics of the one or more machines or processes, an analog signal processing circuit for preprocessing the analog sensor signal before conversion into a digital signal, an analog-to-digital conversion circuit for oversampling the analog sensor signal at a sampling rate to generate oversampled dynamic digital measurement data, and a decimation processor programmed to derive at least two synchronized datasets from the oversampled dynamic digital measurement data, the at least two synchronized datasets comprising a first dataset resulting from filtering and nonselective decimation of the oversampled dynamic digital measurement data, and a second dataset resulting from filtering and selective decimation of the oversampled dynamic digital measurement data, the portable digital transducer further comprising:
   a memory device for storing the at least two synchronized datasets until the at least two synchronized datasets are transferred to an external device;
   a digital signal processing circuit controlling the portable digital transducer in collecting the oversampled dynamic digital measurement data and storing the at least two synchronized datasets in the memory device in multiple data groups with information associating each data group;
   a communications interface for transferring configuration settings from an external device to the memory device and for transferring the at least two synchronized datasets from the memory device to an external device;
   a power source for powering the portable digital transducer to collect and store the dynamic digital measurement data, and maintain the at least two synchronized datasets in the memory device until the at least two synchronized datasets are transferred to the external device; and
   a portable housing in which the dynamic analog sensor, analog signal processing circuit, analog-to-digital conversion circuit, decimation processor, digital signal processing circuit, memory device, communications interface, and power source are disposed, the portable housing configured for cable-free data collection, wherein
   the memory device stores skip-processing configuration settings indicating a first set of time durations and a second set of time durations that all occur within an extended period of time, wherein dynamic digital measurement data is to be collected during the first set of time durations, and no dynamic measurement data is to be collected during the second set of time durations; and the digital signal processing circuit loads from the memory device the skip-processing configuration settings and controls the portable digital transducer to collect the dynamic measurement data during the first set of time durations and not collect dynamic measurement data during the second set of time durations.

19. The portable digital transducer of claim 18 wherein:
the dynamic analog sensor comprises a multi-axis sensor for simultaneously generating multiple analog sensor signals based on measurements of dynamic characteristics of the one or more machines or processes in multiple axes;
the digital signal processing circuit controls the digital transducer in collecting the dynamic measurement data associated with the multiple axes and storing the synchronized datasets in the memory device in multiple data groups with timing information indicating that the multiple data groups were collected simultaneously.

20. A portable digital transducer for collecting dynamic measurement data associated with one or more machines or processes, the portable digital transducer having a dynamic analog sensor for generating an analog sensor signal based on measurements of dynamic characteristics of the one or more machines or processes, an analog signal processing circuit for preprocessing the analog sensor signal before conversion into a digital signal, an analog-to-digital conversion circuit for oversampling the analog sensor signal at a sampling rate to generate oversampled dynamic digital measurement data, and a decimation processor programmed to derive at least two synchronized datasets from the oversampled dynamic digital measurement data, the at least two synchronized datasets comprising a first dataset resulting from filtering and nonselective decimation of the oversampled dynamic digital measurement data, and a second dataset resulting from filtering and selective decimation of the oversampled dynamic digital measurement data, an the portable digital transducer comprising:
 a memory device for storing the at least two synchronized datasets until the at least two synchronized datasets are transferred to an external device;
 a digital signal processing circuit controlling the portable digital transducer in collecting the oversampled dynamic digital measurement data and storing the at least two synchronized datasets in the memory device in multiple data groups with information associating each data group;
 a communications interface for transferring configuration settings from an external device to the memory device and for transferring the at least two synchronized datasets from the memory device to an external device;
 a power source for powering the portable digital transducer to collect and store the dynamic digital measurement data, and maintain the at least two synchronized datasets in the memory device until the at least two synchronized datasets are transferred to the external device;
 a portable housing in which the dynamic analog sensor, analog signal processing circuit, analog-to-digital conversion circuit, decimation processor, digital signal processing circuit, memory device, communications interface, and power source are disposed, the portable housing configured for cable-free data collection; and
 an attachment detection sensor for generating an attachment signal indicating that the housing has been attached to a surface on the machine or a surface associated with the process, the attachment detection sensor selected from the group consisting of a capacitive sensor, an inductive sensor, a conductive sensor, a Hall effect sensor, a vibration sensor, a magnetic sensor, a temperature sensor, and an optical sensor, wherein the digital signal processing circuit controls the digital transducer to begin a data collection process or generate a prompt for an operator only after the attachment signal has been generated.

21. The portable digital transducer of claim 20 wherein the analog-to-digital conversion circuit oversamples the dynamic analog sensor signal at a fixed-frequency sampling rate over a predetermined fixed sampling duration that is sufficient to generate dynamic digital measurement data indicative of multiple characteristics of the machine or process, thereby eliminating multiple setup steps associated with measuring multiple characteristics separately.

22. The portable digital transducer of claim 21 wherein the predetermined fixed sampling duration is three seconds.

23. A portable digital transducer for collecting dynamic measurement data associated with one or more machines or processes, the portable digital transducer having a dynamic analog sensor for generating an analog sensor signal based on measurements of dynamic characteristics of the one or more machines or processes, an analog signal processing circuit for preprocessing the analog sensor signal before conversion into a digital signal, an analog-to-digital conversion circuit for oversampling the analog sensor signal at a sampling rate to generate oversampled dynamic digital measurement data, and a decimation processor programmed to derive at least two synchronized datasets from the oversampled dynamic digital measurement data, the at least two synchronized datasets comprising a first dataset resulting from filtering and nonselective decimation of the oversampled dynamic digital measurement data, and a second dataset resulting from filtering and selective decimation of the oversampled dynamic digital measurement data, the portable digital transducer further comprising:
 a memory device for storing the at least two synchronized datasets until the at least two synchronized datasets are transferred to an external device;
 a digital signal processing circuit controlling the portable digital transducer in collecting the oversampled dynamic digital measurement data and storing the at least two synchronized datasets in the memory device in multiple data groups with information associating each data group;
 a communications interface for transferring configuration settings from an external device to the memory device and for transferring the at least two synchronized datasets from the memory device to an external device;
 a power source for powering the portable digital transducer to collect and store the dynamic digital measurement data, and maintain the at least two synchronized datasets in the memory device until the at least two synchronized datasets are transferred to the external device;
 a portable housing in which the dynamic analog sensor, analog signal processing circuit, analog-to-digital conversion circuit, decimation processor, digital signal processing circuit, memory device, communications interface, and power source are disposed, the portable housing configured for cable-free data collection; and
 a location determination circuit for reading identification information from an identifier device disposed at a measurement location, the identification information uniquely identifying the measurement location at which the identifier device is disposed, wherein the digital signal processing circuit uses the identification information to load from the memory device configuration settings uniquely associated with the measurement location identified by the identification information.

24. The portable digital transducer of claim 23 wherein the identifier device comprises a radio frequency identification (RFID) tag or a bar code, and the location determination circuit comprises an RFID tag reader or a bar code reader.

25. A portable digital transducer for collecting dynamic measurement data associated with one or more machines or processes, the portable digital transducer having a dynamic analog sensor for generating an analog sensor signal based on measurements of dynamic characteristics of the one or more machines or processes, an analog signal processing circuit for preprocessing the analog sensor signal before conversion into a digital signal, an analog-to-digital conversion circuit for oversampling the analog sensor signal at a sampling rate to generate oversampled dynamic digital measurement data, and a decimation processor programmed to derive at least two synchronized datasets from the oversampled dynamic digital measurement data, the at least two synchronized datasets comprising a first dataset resulting from filtering and nonselective decimation of the oversampled dynamic digital measurement data, and a second dataset resulting from filtering and selective decimation of the oversampled dynamic digital measurement data, the portable digital transducer comprising:
- a memory device for storing the at least two synchronized datasets until the at least two synchronized datasets are transferred to an external device;
- a digital signal processing circuit controlling the portable digital transducer in collecting the oversampled dynamic digital measurement data and storing the at least two synchronized datasets in the memory device in multiple data groups with information associating each data group;
- a communications interface for transferring configuration settings from an external device to the memory device and for transferring the at least two synchronized datasets from the memory device to an external device;
- a power source for powering the portable digital transducer to collect and store the dynamic digital measurement data, and maintain the at least two synchronized datasets in the memory device until the at least two synchronized datasets are transferred to the external device; and
- a portable housing in which the dynamic analog sensor, analog signal processing circuit, analog-to-digital conversion circuit, decimation processor, digital signal processing circuit, memory device, communications interface, and power source are disposed, the portable housing configured for cable-free data collection, wherein the memory device stores leave-in-place configuration settings associated with at least one leave-in-place measurement location, the leave-in-place configuration settings indicating data collection time durations at which dynamic measurement data is to be collected while the portable digital transducer is left in place at the at least one leave-in-place measurement location for an extended period of time; and the digital signal processing circuit loads from the memory device the leave-in-place configuration settings and controls the portable digital transducer to collect the dynamic measurement data at the data collection time durations and not collect dynamic measurement data during periods of time between the data collection time durations.

26. The portable digital transducer of claim 25 wherein the memory device stores the leave-in-place configuration settings indicating a certain number of times that the portable digital transducer is to collect the dynamic measurement data during the extended period of time.

27. The portable digital transducer of claim 25 wherein the digital signal processing circuit comprises multiple parallel field programmable gate array (FPGA) channels operable to provide one or more of the following functions:
- adaptive changing of data analysis techniques;
- complete reconfiguration of the portable digital transducer in the field; and
- complying with multi-channel comparisons.

28. The portable digital transducer of claim 25 wherein the communications interface is operable to communicate with a control system using a control system communications protocol, and wherein electrical power is transferred from the control system to the portable digital transducer via the communications interface.

29. The portable digital transducer of claim 25 wherein the housing has a polygon cross-section.

30. The portable digital transducer of claim 29 wherein the housing has a cross-section selected from the group consisting of rectangular, pentagonal, hexagonal, and octagonal.

31. A portable digital transducer for collecting dynamic measurement data associated with one or more machines or processes, the portable digital transducer having a dynamic analog sensor for generating an analog sensor signal based on measurements of dynamic characteristics of the one or more machines or processes, an analog signal processing circuit for preprocessing the analog sensor signal before conversion into a digital signal, an analog-to-digital conversion circuit for oversampling the analog sensor signal at a sampling rate to generate oversampled dynamic digital measurement data, and a decimation processor programmed to derive at least two synchronized datasets from the oversampled dynamic digital measurement data, the at least two synchronized datasets comprising a first dataset resulting from filtering and nonselective decimation of the oversampled dynamic digital measurement data, and a second dataset resulting from filtering and selective decimation of the oversampled dynamic digital measurement data, the portable digital transducer comprising:
- a memory device for storing the at least two synchronized datasets until the at least two synchronized datasets are transferred to an external device;
- a digital signal processing circuit controlling the portable digital transducer in collecting the oversampled dynamic digital measurement data and storing the at least two synchronized datasets in the memory device in multiple data groups with information associating each data group;
- a communications interface for transferring configuration settings from an external device to the memory device and for transferring the at least two synchronized datasets from the memory device to an external device;
- a power source for powering the portable digital transducer to collect and store the dynamic digital measurement data, and maintain the at least two synchronized datasets in the memory device until the at least two synchronized datasets are transferred to the external device; and a portable housing in which the dynamic analog sensor, analog signal processing circuit, analog-to-digital conversion circuit, decimation processor, digital signal processing circuit, memory device, communications interface, and power source are disposed, the portable housing configured for cable-free data collection, wherein the communications interface transfers the oversampled dynamic digital measurement data from the memory device to an external device prior to any processing or decimation of the oversampled dynamic digital measurement data.

32. The portable digital transducer of claim 31 wherein the digital signal processing circuit arranges the oversampled dynamic digital measurement data into multiple sequential sampling interval datasets and selectively decimates the oversampled dynamic digital measurement data within each sampling interval dataset to produce scalar values corresponding to the sampling interval datasets, and the communications interface transfers the scalar values from the memory device to the external device after selective decimation of the oversampled dynamic digital measurement data.

33. The portable digital transducer of claim 31 for functioning as a tachometer or inclinometer or encoder, wherein the portable housing is configured to be securely attached to a rotating component of one of the one or more machines or processes, and the dynamic analog sensor comprises a micro-electromechanical system (MEMS) sensor for generating the analog sensor signal to be indicative of an angular orientation of the rotating component to which the portable housing is attached.

* * * * *